US012064783B2

(12) United States Patent
Gerson et al.

(10) Patent No.: US 12,064,783 B2
(45) Date of Patent: Aug. 20, 2024

(54) LIQUID SUPPLY ASSEMBLY

(71) Applicants: SAINT-GOBAIN ABRASIVES, INC., Worcester, MA (US); SAINT-GOBAIN ABRASIFS, Conflans-Sainte-Honorine (FR)

(72) Inventors: Ronald L. Gerson, Carlisle, MA (US); Pierre LaPointe, Plainville, MA (US); Robert A. Brunell, Forestdale, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 0 days.

(21) Appl. No.: 18/314,009

(22) Filed: May 8, 2023

(65) Prior Publication Data

US 2023/0271203 A1 Aug. 31, 2023

Related U.S. Application Data

(60) Continuation of application No. 17/324,186, filed on May 19, 2021, now Pat. No. 11,679,399, which is a (Continued)

(51) Int. Cl.
*B05B 7/30* (2006.01)
*B05B 7/24* (2006.01)

(52) U.S. Cl.
CPC .............. *B05B 7/2408* (2013.01); *B05B 7/24* (2013.01); *B05B 7/2405* (2013.01); *B05B 7/2478* (2013.01); *B05B 7/2481* (2013.01)

(58) Field of Classification Search
CPC ....... B05B 7/24; B05B 7/2408; B05B 7/2405; B05B 7/2478; B05B 7/2481; B65D 90/046

(Continued)

(56) References Cited

U.S. PATENT DOCUMENTS 533,489 A 2/1895 Ogram
758,239 A 4/1904 Ducart (Continued)

FOREIGN PATENT DOCUMENTS

AU 200032550 B3 7/2000
AU 199935838 A1 1/2001

(Continued)

OTHER PUBLICATIONS

Complaint and Demand for Jury Trial, *3M Innovative Properties Company and 3M Company* vs. *Louis M. Gerson Co, Inc., and Gerson Professional Products, Inc.*, Civil No. 08-04960 JRT-FLN (U.S. District Court, District of Minnesota), filed Aug. 19, 2008 (30 pages).

(Continued)

*Primary Examiner* — John K Fristoe, Jr.
*Assistant Examiner* — Elizabeth J Volz
(74) *Attorney, Agent, or Firm* — Abel Schillinger, LLP; Arpan Ghosh

(57) ABSTRACT

A connector system for a liquid container system for a spray gun includes a lid that includes a liquid outlet and an adapter. The adapter includes a spray gun end and a lid end. The ends are connected with a liquid-tight passageway. Further, the spray gun end is adapted for releasable engagement with a liquid inlet port of the spray gun and the lid end is adapted for releasable engagement with the liquid outlet. The connector system also includes a plurality of interlocking tab assemblies for releasably attaching the adapter to the lid. Each assembly includes a first tab and a second tab, wherein an end of the first tab is adapted to secure the adapter to the lid when the first tab and the second tab are interlocked.

22 Claims, 16 Drawing Sheets

Related U.S. Application Data continuation of application No. 16/049,292, filed on Jul. 30, 2018, now Pat. No. 11,040,360, which is a continuation-in-part of application No. 14/093,122, filed on Nov. 29, 2013, now Pat. No. 10,035,156, which is a continuation of application No. 13/268,340, filed on Oct. 7, 2011, now abandoned, which is a division of application No. 11/762,890, filed on Jun. 14, 2007, now Pat. No. 8,033,413.

(60) Provisional application No. 60/828,245, filed on Oct. 5, 2006, provisional application No. 60/815,142, filed on Jun. 20, 2006.

(58) Field of Classification Search
USPC ....... 239/302, 345, 346, 329, 375, 376, 377, 239/378, 379; 220/324, 315, 62.21
See application file for complete search history.

(56) References Cited

U.S. PATENT DOCUMENTS 1,370,687 A 3/1921 Ferris
1,556,913 A 10/1924 Capra
1,703,384 A 2/1929 Birkenmaier
1,722,101 A 7/1929 Little
1,748,440 A 2/1930 Burdick
1,843,269 A 2/1932 Capser
1,843,899 A 2/1932 Martinet
2,004,574 A 6/1935 Gee, Jr.
2,005,026 A 6/1935 Ellsworth
2,051,518 A 8/1936 Cunningham
D105,960 S 9/1937 Lieberman
2,177,032 A 10/1939 Baumgardner
2,200,675 A 5/1940 Northcutt
2,228,861 A 1/1941 Wegener
2,310,633 A 2/1943 Heimburger
2,318,717 A 5/1943 Rose
2,593,639 A 4/1952 Whitehouse
2,593,839 A 4/1952 Buc
2,595,317 A 5/1952 White
2,606,586 A 8/1952 Hill
2,612,404 A 9/1952 Andersson
2,641,365 A 6/1953 Lundeen
2,656,217 A 10/1953 Roche
2,670,239 A 2/1954 Ditch
2,670,882 A 3/1954 Best
2,720,998 A 10/1955 Potter
2,770,706 A 11/1956 Vogtle et al.
2,795,461 A 6/1957 Durkin
2,851,187 A 9/1958 Hall
2,877,934 A 3/1959 Wallace
2,901,182 A 8/1959 Cragg et al.
2,959,358 A 11/1960 Vork
3,000,576 A 9/1961 Levey et al.
3,035,623 A 5/1962 Goetz
3,066,872 A 12/1962 Kobee
3,134,494 A 5/1964 Quinn
3,136,486 A 6/1964 Docken
3,157,360 A 11/1964 Heard
3,163,544 A 12/1964 Valyi
3,167,210 A 1/1965 Carney, Jr.
3,186,643 A 6/1965 George et al.
3,195,819 A 7/1965 Watanabe
3,198,438 A 8/1965 Hultgren
3,211,324 A 10/1965 Sapien
3,227,305 A 1/1966 Enssle
3,236,459 A 2/1966 McRitchie
3,240,398 A 3/1966 Dalton, Jr.
3,255,972 A 6/1966 Hultgren et al.
3,260,464 A 7/1966 Harant
3,335,913 A 8/1967 Bouet
3,338,406 A 8/1967 Anderson
3,362,640 A 1/1968 Fainman
3,381,845 A 5/1968 MacDonald
3,393,842 A 7/1968 Bruce et al.
3,401,842 A 9/1968 Morrison
3,406,853 A 10/1968 McLeod
3,432,104 A 3/1969 Kaltenbach
3,487,989 A 1/1970 Rausing et al.
3,507,309 A 4/1970 Johnson
3,524,589 A 8/1970 Pelton, Jr.
3,593,921 A 7/1971 Boltic
3,606,092 A 9/1971 Kollmai
3,658,122 A 4/1972 Kalyk
3,672,645 A 6/1972 Terrels et al.
3,674,074 A 7/1972 Lavis
3,757,718 A 9/1973 Johnson
3,773,211 A 11/1973 Bridgman
3,776,408 A 12/1973 Wald
3,779,419 A 12/1973 Heitz
3,780,950 A 12/1973 Brennan
3,784,039 A 1/1974 Marco
3,790,017 A 2/1974 Fitzpatrick et al.
3,790,021 A 2/1974 Bailey
3,815,967 A 6/1974 Jocelyn
3,841,555 A 10/1974 Lilja
3,853,157 A 12/1974 Madaio
3,858,810 A 1/1975 Seeley et al.
3,892,360 A 7/1975 Schlottmann et al.
3,934,746 A 1/1976 Lilja
3,937,367 A 2/1976 Hood
3,939,842 A 2/1976 Harris
3,940,052 A 2/1976 McHugh
4,035,004 A 7/1977 Hengesbach
4,043,510 A 8/1977 Morris
4,067,499 A 1/1978 Cohen
4,069,751 A 1/1978 Gronwick et al.
4,088,268 A 5/1978 Vohringer
4,095,720 A 6/1978 Delbrouck et al.
4,122,973 A 10/1978 Ahern
4,140,279 A 2/1979 Hawkins
4,151,929 A 5/1979 Sapien
4,159,081 A 6/1979 Demler
4,186,783 A 2/1980 Brandt
4,193,506 A 3/1980 Trindle et al.
D257,668 S 12/1980 Ahern
4,258,862 A 3/1981 Thorsheim
4,307,820 A 12/1981 Binoche
4,321,922 A 3/1982 Deaton
4,339,046 A 7/1982 Coen
4,347,948 A 9/1982 Hamada et al.
4,379,455 A 4/1983 Deaton
4,383,635 A 5/1983 Yotoriyama
4,388,044 A 6/1983 Wilkinson
4,401,274 A 8/1983 Coffee
4,403,738 A 9/1983 Kern
4,405,088 A 9/1983 Gray
4,406,406 A 9/1983 Knapp
4,411,387 A 10/1983 Stern et al.
4,418,843 A 12/1983 Jackman
4,430,084 A 2/1984 Deaton
4,442,003 A 4/1984 Holt
4,455,140 A 6/1984 Joslin
4,457,455 A 7/1984 Meshberg
4,491,254 A 1/1985 Viets et al.
4,501,500 A 2/1985 Terrels
4,516,693 A 5/1985 Gaston
4,558,792 A 12/1985 Cabernoch et al.
4,559,140 A 12/1985 Croteau
4,562,965 A 1/1986 Ihmels et al.
D283,832 S 5/1986 Weinstein et al.
4,586,628 A 5/1986 Nittel
4,621,770 A 11/1986 Sayen
4,623,095 A 11/1986 Pronk
4,625,890 A 12/1986 Galer
4,628,644 A 12/1986 Somers
4,633,052 A 12/1986 Beavers et al.
4,645,097 A 2/1987 Kaufman
4,653,691 A 3/1987 Grime
4,657,151 A 4/1987 Cabernoch
D290,990 S 7/1987 Izzi
4,693,423 A 9/1987 Roe et al.
4,712,739 A 12/1987 Bihn

(56) References Cited

U.S. PATENT DOCUMENTS

| | | | |
|---|---|---|---|
| 4,760,962 | A | 8/1988 | Wheeler |
| 4,781,311 | A | 11/1988 | Dunning et al. |
| 4,811,904 | A | 3/1989 | Ihmels et al. |
| 4,813,556 | A | 3/1989 | Lawrence |
| 4,813,609 | A | 3/1989 | French |
| D300,555 | S | 4/1989 | Patterson |
| 4,818,589 | A | 4/1989 | Johnson et al. |
| 4,824,018 | A | 4/1989 | Shreve |
| 4,836,764 | A | 6/1989 | Parkinson |
| 4,909,409 | A | 3/1990 | Shreve |
| 4,925,055 | A | 5/1990 | Robbins, III et al. |
| 4,930,644 | A | 6/1990 | Robbins, III |
| 4,936,511 | A | 6/1990 | Johnson et al. |
| D309,858 | S | 8/1990 | Meyersburg |
| 4,946,558 | A | 8/1990 | Salmon |
| 4,951,875 | A | 8/1990 | Devey |
| 4,961,537 | A | 10/1990 | Stern |
| 4,962,885 | A | 10/1990 | Coffee |
| 4,971,251 | A | 11/1990 | Dobrick et al. |
| 4,979,628 | A | 12/1990 | Robbins, III |
| 4,982,868 | A | 1/1991 | Robbins, III |
| 4,998,696 | A | 3/1991 | Desjardins |
| 4,999,109 | A | 3/1991 | Sabre |
| 5,005,726 | A | 4/1991 | Robbins |
| 5,035,339 | A | 7/1991 | Meyersburg |
| 5,052,623 | A | 10/1991 | Nordeen |
| 5,054,687 | A | 10/1991 | Burns et al. |
| 5,059,319 | A | 10/1991 | Welsh |
| 5,060,816 | A | 10/1991 | Robbins, III |
| 5,069,389 | A | 12/1991 | Bitsakos |
| 5,071,070 | A | 12/1991 | Hardy |
| 5,078,322 | A | 1/1992 | Torntore |
| 5,078,323 | A | 1/1992 | Frank |
| 5,094,543 | A | 3/1992 | Mursa |
| 5,102,052 | A | 4/1992 | Demarest et al. |
| 5,102,384 | A | 4/1992 | Ross et al. |
| 5,118,003 | A | 6/1992 | Pepper et al. |
| 5,119,992 | A | 6/1992 | Grime |
| 5,123,571 | A | 6/1992 | Rebeyrolle et al. |
| 5,143,242 | A | 9/1992 | Millasich |
| 5,143,294 | A | 9/1992 | Lintvedt |
| 5,186,828 | A | 2/1993 | Mankin |
| 5,209,365 | A | 5/1993 | Wood |
| 5,209,501 | A | 5/1993 | Smith |
| 5,236,128 | A | 8/1993 | Morita et al. |
| 5,236,506 | A | 8/1993 | Mazakas |
| 5,238,150 | A | 8/1993 | Williams |
| 5,248,089 | A | 9/1993 | Bekius |
| 5,248,096 | A | 9/1993 | Hoey et al. |
| 5,253,900 | A | 10/1993 | Snyder |
| D341,189 | S | 11/1993 | Legassie et al. |
| 5,259,400 | A | 11/1993 | Bruno et al. |
| 5,261,751 | A | 11/1993 | Heinz |
| 5,267,693 | A | 12/1993 | Dickey |
| 5,269,840 | A | 12/1993 | Morris et al. |
| 5,295,606 | A | 3/1994 | Karwoski |
| 5,308,647 | A | 5/1994 | Lappi |
| 5,326,001 | A | 7/1994 | Holmquist et al. |
| 5,328,095 | A | 7/1994 | Wickenhaver |
| 5,332,158 | A | 7/1994 | Styne et al. |
| 5,337,921 | A | 8/1994 | Wilson et al. |
| 5,341,836 | A | 8/1994 | Doherty |
| 5,358,402 | A | 10/1994 | Reed et al. |
| 5,368,395 | A | 11/1994 | Crimmins |
| 5,377,852 | A | 1/1995 | Demorest |
| 5,381,918 | A | 1/1995 | Dahl |
| 5,385,251 | A | 1/1995 | Dunn |
| 5,400,573 | A | 3/1995 | Crystal et al. |
| 5,405,090 | A | 4/1995 | Greene et al. |
| 5,415,352 | A | 5/1995 | May |
| 5,421,489 | A | 6/1995 | Holzner, Sr. et al. |
| 5,424,086 | A | 6/1995 | Walker |
| 5,454,488 | A | 10/1995 | Geier |
| 5,460,289 | A | 10/1995 | Gemmell |
| 5,462,711 | A | 10/1995 | Ricottone |
| 5,468,383 | A | 11/1995 | McKenzie |
| 5,492,242 | A | 2/1996 | Gall |
| 5,501,397 | A | 3/1996 | Holt |
| 5,555,997 | A | 9/1996 | Nogles |
| 5,569,377 | A | 10/1996 | Hashimoto |
| 5,582,350 | A | 12/1996 | Kosmyna et al. |
| 5,607,082 | A | 3/1997 | Cracauer |
| 5,617,972 | A | 4/1997 | Morano et al. |
| 5,631,055 | A | 5/1997 | Vines et al. |
| 5,655,714 | A | 8/1997 | Kieffer et al. |
| 5,667,858 | A | 9/1997 | Pokorny |
| D386,654 | S | 11/1997 | Kosmyna |
| 5,695,837 | A | 12/1997 | Everaerts et al. |
| 5,713,519 | A | 2/1998 | Sandison et al. |
| 5,789,684 | A | 8/1998 | Masek et al. |
| 5,797,520 | A | 8/1998 | Donahue |
| 5,803,302 | A | 9/1998 | Sato et al. |
| 5,803,367 | A | 9/1998 | Heard et al. |
| 5,806,711 | A | 9/1998 | Morano et al. |
| 5,816,431 | A | 10/1998 | Giannopoulos |
| 5,816,501 | A | 10/1998 | LoPresti et al. |
| 5,826,795 | A | 10/1998 | Holland et al. |
| 5,829,588 | A | 11/1998 | Bloomfield |
| 5,853,102 | A | 12/1998 | Jarrett |
| 5,863,431 | A | 1/1999 | Salzburg |
| 5,878,899 | A | 3/1999 | Manganiello et al. |
| 5,921,426 | A | 7/1999 | Randolph |
| 5,938,016 | A | 8/1999 | Erdtmann |
| 5,954,273 | A | 9/1999 | Ruta et al. |
| 5,964,365 | A | 10/1999 | Peeples et al. |
| 5,967,379 | A | 10/1999 | Crossdale et al. |
| 5,996,427 | A | 12/1999 | Masek et al. |
| 6,019,294 | A | 2/2000 | Anderson et al. |
| 6,027,041 | A | 2/2000 | Evans |
| 6,053,429 | A | 4/2000 | Chang |
| 6,092,740 | A | 7/2000 | Liu |
| D431,279 | S | 9/2000 | Spriegel |
| 6,196,410 | B1 | 3/2001 | Hocking |
| 6,257,429 | B1 | 7/2001 | Kong |
| 6,264,115 | B1 | 7/2001 | Liska et al. |
| 6,277,478 | B1 | 8/2001 | Kurita et al. |
| 6,287,669 | B1 | 9/2001 | George et al. |
| D449,381 | S | 10/2001 | de Begon de Larouziere |
| 6,302,445 | B1 | 10/2001 | Kugele et al. |
| 6,371,385 | B1 | 4/2002 | Schiller et al. |
| 6,390,386 | B2 | 5/2002 | Krohn et al. |
| 6,394,152 | B1 | 5/2002 | Martin |
| D460,825 | S | 7/2002 | Renz |
| 6,435,426 | B1 | 8/2002 | Copp, Jr. |
| D462,268 | S | 9/2002 | Schroeder et al. |
| 6,455,140 | B1 | 9/2002 | Whitney et al. |
| 6,475,609 | B1 | 11/2002 | Whitney et al. |
| 6,536,684 | B1 | 3/2003 | Wei |
| 6,536,687 | B1 | 3/2003 | Navis et al. |
| 6,588,681 | B2 | 7/2003 | Rothrum et al. |
| 6,595,441 | B2 | 7/2003 | Petrie et al. |
| 6,663,018 | B2 | 12/2003 | Rothrum et al. |
| 6,698,670 | B1 | 3/2004 | Gosis et al. |
| 6,712,292 | B1 | 3/2004 | Gosis et al. |
| 6,717,673 | B1 | 4/2004 | Janssen et al. |
| 6,749,132 | B2 | 6/2004 | Pettit et al. |
| 6,752,179 | B1 | 6/2004 | Schwartz |
| 6,796,514 | B1 | 9/2004 | Schwartz |
| 6,820,824 | B1 | 11/2004 | Joseph et al. |
| 6,871,594 | B1 | 3/2005 | Estrella |
| 6,877,677 | B2 | 4/2005 | Schmon et al. |
| 6,899,239 | B1 | 5/2005 | Gray |
| 6,938,836 | B2 | 9/2005 | Bouic |
| 6,942,126 | B2 | 9/2005 | Douglas et al. |
| 6,945,429 | B2 | 9/2005 | Gosis et al. |
| 6,946,122 | B2 | 9/2005 | Yang |
| 6,953,155 | B2 | 10/2005 | Joseph et al. |
| 6,958,033 | B1 | 10/2005 | Malin |
| 6,982,108 | B2 | 1/2006 | Janssen et al. |
| 7,014,127 | B2 | 3/2006 | Valpey, III et al. |
| 7,083,119 | B2 | 8/2006 | Bouic et al. |
| 7,086,549 | B2 | 8/2006 | Kosmyna et al. |
| 7,128,102 | B2 | 10/2006 | Pendleton et al. |
| 7,143,960 | B2 | 12/2006 | Joseph et al. |

(56) References Cited

U.S. PATENT DOCUMENTS

| | | | |
|---|---|---|---|
| 7,159,734 | B1 | 1/2007 | O'Brien |
| 7,165,732 | B2 | 1/2007 | Kosmyna et al. |
| 7,172,139 | B2 | 2/2007 | Bouic et al. |
| 7,188,785 | B2 | 3/2007 | Joseph et al. |
| 7,269,969 | B2 | 9/2007 | Strickland et al. |
| 7,296,759 | B2 | 11/2007 | Alexander et al. |
| 7,344,040 | B2 | 3/2008 | Kosmyna et al. |
| 7,353,964 | B2 | 4/2008 | Kosmyna |
| 7,354,074 | B2 | 4/2008 | Kosmyna et al. |
| 7,374,111 | B2 | 5/2008 | Joseph et al. |
| 7,380,680 | B2 | 6/2008 | Kosmyna et al. |
| 7,451,884 | B2 | 11/2008 | Kuehn et al. |
| D582,512 | S | 12/2008 | Fontaine |
| D586,059 | S | 2/2009 | Bechtold, Jr. |
| 7,568,638 | B2 | 8/2009 | Gehrung |
| 7,625,016 | B2 | 12/2009 | Kosmyna et al. |
| D615,161 | S | 5/2010 | Gerson et al. |
| 7,757,972 | B2 | 7/2010 | Kosmyna et al. |
| 7,798,421 | B2 | 9/2010 | Joseph et al. |
| 7,798,425 | B2 | 9/2010 | Joseph et al. |
| 7,798,426 | B2 | 9/2010 | Joseph et al. |
| 7,798,427 | B2 | 9/2010 | Joseph et al. |
| 7,802,763 | B2 | 9/2010 | Faller et al. |
| 7,810,744 | B2 | 10/2010 | Schmon et al. |
| 7,819,263 | B1 | 10/2010 | DiCarlo-Nelson |
| 7,819,341 | B2 | 10/2010 | Schmon et al. |
| 7,823,806 | B2 | 11/2010 | Schmon |
| 7,878,425 | B2 | 2/2011 | Handzel et al. |
| 7,921,583 | B2 | 4/2011 | Londino |
| 8,002,200 | B2 | 8/2011 | Joseph et al. |
| 8,033,413 | B2 | 10/2011 | Gerson et al. |
| 8,127,963 | B2 | 3/2012 | Gerson et al. |
| 8,201,709 | B1 | 6/2012 | Namigata et al. |
| 8,230,997 | B1 | 7/2012 | McWilliams et al. |
| 8,272,255 | B2 | 9/2012 | Halverson et al. |
| 2002/0014541 | A1 | 2/2002 | Krohn et al. |
| 2002/0121139 | A1 | 9/2002 | Purpura et al. |
| 2003/0003301 | A1 | 1/2003 | Whitney et al. |
| 2003/0008144 | A1 | 1/2003 | Whitney et al. |
| 2003/0209573 | A1 | 11/2003 | Bouic |
| 2004/0016825 | A1 | 1/2004 | Petrie et al. |
| 2004/0067350 | A1 | 4/2004 | Janssen et al. |
| 2004/0084553 | A1 | 5/2004 | Joseph et al. |
| 2004/0118941 | A1 | 6/2004 | Joseph et al. |
| 2004/0140373 | A1 | 7/2004 | Joseph et al. |
| 2004/0164182 | A1 | 8/2004 | Joseph et al. |
| 2004/0217201 | A1 | 11/2004 | Ruda |
| 2004/0232714 | A1 | 11/2004 | Coppotelli et al. |
| 2004/0256484 | A1 | 12/2004 | Joseph et al. |
| 2004/0256485 | A1 | 12/2004 | Joseph et al. |
| 2005/0029285 | A1 | 2/2005 | Gay, III et al. |
| 2005/0045146 | A1 | 3/2005 | McKay et al. |
| 2005/0067502 | A1* | 3/2005 | Bouic .................. B05B 7/2408 239/345 |
| 2005/0092770 | A1 | 5/2005 | Yechouron |
| 2005/0145718 | A1 | 7/2005 | Blette et al. |
| 2005/0145723 | A1 | 7/2005 | Blette et al. |
| 2005/0145724 | A1 | 7/2005 | Blette et al. |
| 2005/0156058 | A1 | 7/2005 | Kosmyna et al. |
| 2005/0241722 | A1 | 11/2005 | Pendleton et al. |
| 2005/0242107 | A1 | 11/2005 | Kosmyna et al. |
| 2005/0247804 | A1 | 11/2005 | Douglas et al. |
| 2005/0258271 | A1 | 11/2005 | Kosmyna et al. |
| 2005/0263614 | A1 | 12/2005 | Kosmyna et al. |
| 2005/0279748 | A1 | 12/2005 | Kosmyna |
| 2006/0000927 | A1* | 1/2006 | Ruda .................... B05B 7/2408 239/345 |
| 2006/0017286 | A1 | 1/2006 | Kosmyna et al. |
| 2006/0065591 | A1 | 3/2006 | Joseph |
| 2006/0102550 | A1* | 5/2006 | Joseph ................. B05B 7/2408 210/474 |
| 2006/0144960 | A1 | 7/2006 | Kosmyna et al. |
| 2006/0151630 | A1 | 7/2006 | Joseph et al. |
| 2006/0157594 | A1 | 7/2006 | Cooke |
| 2006/0175433 | A1 | 8/2006 | Escoto, Jr. et al. |
| 2006/0196891 | A1 | 9/2006 | Gerson et al. |
| 2006/0273204 | A1 | 12/2006 | Joseph et al. |
| 2006/0283861 | A1 | 12/2006 | Kosmyna et al. |
| 2007/0131793 | A1 | 6/2007 | Joseph et al. |
| 2007/0158348 | A1 | 7/2007 | Kosmyna et al. |
| 2007/0158462 | A1 | 7/2007 | Delbridge |
| 2007/0252019 | A1 | 11/2007 | Peterson et al. |
| 2007/0272323 | A1 | 11/2007 | Verhaeghe |
| 2008/0011879 | A1 | 1/2008 | Gerson et al. |
| 2008/0054087 | A1 | 3/2008 | Joseph et al. |
| 2008/0118656 | A1 | 5/2008 | Douglas et al. |
| 2009/0072050 | A1 | 3/2009 | Ruda |
| 2009/0110861 | A1 | 4/2009 | Sherman |
| 2009/0145980 | A1 | 6/2009 | Jones |
| 2009/0166443 | A1 | 7/2009 | Joseph et al. |
| 2009/0183565 | A1 | 7/2009 | Shamoon et al. |
| 2009/0193880 | A1 | 8/2009 | Halverson et al. |
| 2009/0200309 | A1 | 8/2009 | Kosmyna et al. |
| 2010/0108783 | A1 | 5/2010 | Joseph et al. |
| 2010/0139858 | A1 | 6/2010 | Douglas et al. |
| 2010/0163645 | A1 | 7/2010 | Johnson et al. |
| 2010/0243758 | A1 | 9/2010 | Juo |
| 2010/0288772 | A1 | 11/2010 | Wambeke et al. |
| 2011/0220737 | A1 | 9/2011 | Kwon |
| 2011/0266368 | A1 | 11/2011 | Joseph et al. |
| 2012/0037529 | A1 | 2/2012 | Hall |
| 2012/0256010 | A1 | 10/2012 | Joseph et al. |
| 2012/0273583 | A1 | 11/2012 | Gerson et al. |
| 2012/0279609 | A1 | 11/2012 | Pellegrino et al. |
| 2012/0279613 | A1 | 11/2012 | Pellegrino et al. |
| 2012/0279887 | A1 | 11/2012 | Pellegrino et al. |
| 2012/0279970 | A1 | 11/2012 | Pellegrino et al. |
| 2012/0280062 | A1 | 11/2012 | Pellegrino et al. |
| 2012/0280063 | A1 | 11/2012 | Pellegrino et al. |
| 2013/0001322 | A1 | 1/2013 | Pellegrino et al. |

FOREIGN PATENT DOCUMENTS

| | | | |
|---|---|---|---|
| AU | 2004/202537 | A1 | 1/2005 |
| CA | 963436 | A | 2/1975 |
| CA | 965388 | A | 4/1975 |
| CA | 1006450 | A | 3/1977 |
| CA | 1192852 | A | 9/1985 |
| CA | 2099763 | A1 | 7/1992 |
| CA | 2569369 | A1 | 7/1998 |
| CA | 2660187 | A1 | 7/1998 |
| CA | 2595507 | A1 | 6/2006 |
| CA | 2277096 | C | 4/2007 |
| CH | 540159 | A | 8/1973 |
| CH | 688082 | A5 | 5/1997 |
| CN | 1142830 | C | 3/2004 |
| DE | 534273 | C | 9/1931 |
| DE | 2412743 | A1 | 9/1975 |
| DE | 2900998 | A1 | 7/1980 |
| DE | 3020831 | A1 | 12/1981 |
| DE | 8304005 | U1 | 6/1983 |
| DE | 3439442 | A1 | 4/1986 |
| DE | 3517122 | C1 | 5/1986 |
| DE | 3507734 | A1 | 9/1986 |
| DE | 3346165 | C2 | 4/1987 |
| DE | 8807118 | U1 | 8/1988 |
| DE | 4002190 | A1 | 8/1991 |
| DE | 4102326 | A1 | 7/1992 |
| DE | 4209258 | A1 | 9/1993 |
| DE | 19618514 | A1 | 11/1997 |
| DE | 29905100 | U1 | 6/1999 |
| DE | 20117496 | U1 | 1/2002 |
| DE | 29825015 | U1 | 3/2004 |
| DE | 29825119 | U1 | 1/2005 |
| DE | 29825120 | U1 | 2/2005 |
| DE | 98901823 | T1 | 3/2005 |
| DE | 202004003116 | U1 | 7/2005 |
| DE | 202004003376 | U1 | 7/2005 |
| DE | 202004006907 | U1 | 9/2005 |
| DE | 69831653 | T2 | 9/2006 |
| DE | 69836570 | T2 | 9/2007 |
| EP | 0092359 | A2 | 10/1983 |
| EP | 0202124 | A2 | 11/1986 |
| EP | 0230364 | A2 | 7/1987 |

(56) References Cited

FOREIGN PATENT DOCUMENTS

| | | | |
|---|---|---|---|
| EP | 0345607 | A1 | 12/1989 |
| EP | 0388199 | A2 | 9/1990 |
| EP | 0388696 | A1 | 9/1990 |
| EP | 0467334 | A2 | 1/1992 |
| EP | 0345607 | B1 | 9/1992 |
| EP | 0230364 | B2 | 9/1994 |
| EP | 0624353 | A2 | 11/1994 |
| EP | 0634224 | A1 | 1/1995 |
| EP | 0636548 | A1 | 2/1995 |
| EP | 0678334 | A2 | 10/1995 |
| EP | 0689825 | A1 | 1/1996 |
| EP | 0636548 | B1 | 2/1997 |
| EP | 0536344 | B1 | 10/1997 |
| EP | 0847809 | A1 | 6/1998 |
| EP | 0740692 | B1 | 12/1998 |
| EP | 0624353 | B1 | 2/1999 |
| EP | 0987060 | A1 | 3/2000 |
| EP | 1123957 | A1 | 8/2001 |
| EP | 1047732 | B1 | 9/2002 |
| EP | 1366823 | A1 | 3/2003 |
| EP | 1139841 | B1 | 5/2003 |
| EP | 1047731 | B1 | 6/2003 |
| EP | 1210181 | B1 | 10/2003 |
| EP | 1415719 | A1 | 5/2004 |
| EP | 1424135 | A1 | 6/2004 |
| EP | 1435265 | A2 | 7/2004 |
| EP | 1368129 | B1 | 6/2005 |
| EP | 1566223 | A2 | 8/2005 |
| EP | 1579922 | A1 | 9/2005 |
| EP | 1611960 | A1 | 1/2006 |
| EP | 1415719 | B1 | 11/2006 |
| EP | 000638176-0001 | | 1/2007 |
| EP | 1961488 | A2 | 8/2008 |
| EP | 2090372 | A2 | 8/2009 |
| EP | 2090373 | A2 | 8/2009 |
| EP | 2105208 | A2 | 9/2009 |
| EP | 1435265 | B1 | 11/2009 |
| EP | 2221112 | A2 | 8/2010 |
| EP | 1385632 | B1 | 3/2011 |
| EP | 2090372 | A3 | 11/2011 |
| EP | 2090373 | A3 | 11/2011 |
| EP | 2105208 | A3 | 11/2011 |
| FR | 1282085 | A | 1/1962 |
| FR | 2631254 | A1 | 11/1989 |
| FR | 2639324 | A1 | 5/1990 |
| FR | 2798868 | A1 | 3/2001 |
| GB | 202363 | A | 8/1923 |
| GB | 256179 | A | 6/1927 |
| GB | 290866 | A | 5/1928 |
| GB | 843161 | A | 8/1960 |
| GB | 1077369 | A | 7/1967 |
| GB | 1567685 | A | 5/1980 |
| GB | 2103173 | A | 2/1983 |
| GB | 2170471 | A | 8/1986 |
| GB | 2239821 | A | 7/1991 |
| GB | 2303087 | A | 2/1997 |
| JP | 52113870 | A | 9/1977 |
| JP | 64-27659 | A | 1/1989 |
| JP | JUM 03-81879 | U | 8/1991 |
| JP | JUM 05-39671 | U | 5/1993 |
| JP | 06-328014 | A | 11/1994 |
| JP | 06-335643 | A | 12/1994 |
| JP | 07-289956 | A | 11/1995 |
| JP | 08-133338 | A | 5/1996 |
| JP | 08-192851 | A | 7/1996 |
| JP | JUM 3027372 | U | 8/1996 |
| JP | 107170 | A | 1/1998 |
| JP | 11-28394 | A | 2/1999 |
| JP | 2001508698 | A | 7/2001 |
| JP | 2001252599 | A | 9/2001 |
| JP | 2007130521 | A | 5/2007 |
| JP | 2008036561 | A | 2/2008 |
| KR | 10-2007-0023711 | A | 2/2007 |
| KR | 10-2010-0052366 | A | 5/2010 |
| WO | 90-015758 | A1 | 12/1990 |
| WO | 1992006794 | A1 | 4/1992 |
| WO | 92/11930 | A1 | 7/1992 |
| WO | 92/14437 | A1 | 9/1992 |
| WO | 9219386 | A1 | 11/1992 |
| WO | 1994003337 | A2 | 2/1994 |
| WO | 1994008730 | A1 | 4/1994 |
| WO | 95/07762 | A1 | 3/1995 |
| WO | 95/11170 | A1 | 4/1995 |
| WO | 1995019402 | A1 | 7/1995 |
| WO | 98/00796 | A2 | 1/1998 |
| WO | 98/32539 | A1 | 7/1998 |
| WO | 99/06301 | A1 | 2/1999 |
| WO | 1999036477 | A1 | 7/1999 |
| WO | 1999036478 | A1 | 7/1999 |
| WO | 1999040580 | A1 | 8/1999 |
| WO | 99/50153 | A1 | 10/1999 |
| WO | 00/30844 | A1 | 6/2000 |
| WO | 00/38562 | A1 | 7/2000 |
| WO | 2001014766 | A1 | 3/2001 |
| WO | 2002072276 | A1 | 9/2002 |
| WO | 02/085533 | A1 | 10/2002 |
| WO | 03/006170 | A2 | 1/2003 |
| WO | 03/045575 | A1 | 6/2003 |
| WO | 2003095101 | A1 | 11/2003 |
| WO | 2004030938 | A1 | 4/2004 |
| WO | 2004030939 | A1 | 4/2004 |
| WO | 2004/037432 | A1 | 5/2004 |
| WO | 2004/037433 | A1 | 5/2004 |
| WO | 2004/060574 | A1 | 7/2004 |
| WO | 2004/060575 | A1 | 7/2004 |
| WO | 2004/082848 | A1 | 9/2004 |
| WO | 2004/094072 | A1 | 11/2004 |
| WO | 2005/077543 | A1 | 8/2005 |
| WO | 2005/115631 | A1 | 12/2005 |
| WO | 2005/118151 | A1 | 12/2005 |
| WO | 2005/120178 | A2 | 12/2005 |
| WO | 2005/120718 | A1 | 12/2005 |
| WO | 2006/002497 | A1 | 1/2006 |
| WO | 2006/065850 | A1 | 6/2006 |
| WO | 2006069015 | A1 | 6/2006 |
| WO | 2006098799 | A3 | 9/2006 |
| WO | 2007/037921 | A1 | 4/2007 |
| WO | 2007075724 | A2 | 7/2007 |
| WO | 2006098799 | A9 | 9/2007 |
| WO | 2007149760 | A2 | 12/2007 |
| WO | 2007149760 | A3 | 12/2007 |
| WO | 2008022027 | A2 | 2/2008 |
| WO | 2008060939 | A1 | 5/2008 |
| WO | 2008109733 | A1 | 9/2008 |
| WO | 2008154559 | A1 | 12/2008 |
| WO | 2009058466 | A1 | 5/2009 |
| WO | 2009/076150 | A2 | 6/2009 |
| WO | 2009/076150 | A3 | 6/2009 |
| WO | 2009120547 | A2 | 10/2009 |
| WO | 2012/068316 | A2 | 5/2012 |
| WO | 2012/154619 | A2 | 11/2012 |
| WO | 2012/154621 | A2 | 11/2012 |
| WO | 2012/154622 | A2 | 11/2012 |
| WO | 2012/154623 | A2 | 11/2012 |
| WO | 2012/154624 | A2 | 11/2012 |
| WO | 2012/154625 | A2 | 11/2012 |
| WO | 2013/003592 | A2 | 1/2013 |

OTHER PUBLICATIONS

Defendants' Claim Chart, *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Mar. 2, 2009 (140 pages).

Defendants' Identification of Claim Terms, Phrases or Clauses That May Require Court Construction, *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Apr. 6, 2009 (3 pages).

Defendant's Prior Art Statement, *3M Innovative Properties Company and 3M Company* vs. *Illinois Tool Works, Inc. and ITW Finishing LLC*, Case No. 06-2459 [U.S. District Court, District of Minnesota] filed Apr. 2, 2007 [12 pages].

(56) References Cited

OTHER PUBLICATIONS

Defendants' Prior Art Statement, *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Mar. 2, 2009 (46 pages).
DeVilbiss PT-500, 510 and 520 2½ Gallon Pressure Tank service bulletin—SB-21-041-B., 6 pages.
DeVilbiss Products PT-500, 510 and 520 2½ Gallon Pressure Tank, Oct. 1998, 7 pages.
DeVilbiss Industrial Distributor Net Price List Spray Equipment, DDP-104, Supplement 1, Oct. 1, 1988, 3 pages.
Falkman, M.A. Plastic Discs Scrap Waste for Disposable Containers. Packaging Digest, Jun. 1996, 2 pages.
Louis M. Gerson Co., Inc. and Gerson Professional Products, Inc. Answers to 3M's First Set of Interrogatories to Gerson (Nos. 1-22), *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Dec. 11, 2008 (14 pages).
Notice of Opposition and Grounds of Opposition to European Patent No. EP 0954381, *Illinois Tool Works, Inc.* vs. *3M Company*, dated Jun. 19, 2006, 21 pages.
Plaintiffs' Claim Chart, *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Feb. 2, 2009 (52 pages).
Plaintiffs' Prior Art Statement, *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Apr. 1, 2009 (25 pages).
SATA Jet 90, Operating Instructions, SATA-Fabspritztechnik GmH & Co., 6 pages.
SATA GmbH & Co. KG, "SATA RPS—The cup system for mixing and painting", K-126995/4022-063, 4 pages.
Service Bulletin, SB-4-043-D, Replaces SB-4-043-C, De Vilbiss, "120175 (GFC-502) 32 Oz. Aluminum Gravity Feed Cup with Disposable Lid and Cup Liner", May 2000.
Service Bulletin; SB-21-041-B, replaces SB-21-041-A, PT-500, 510, and 520 2½ Gallon Pressure Tank, Oct. 1987 product literature, 6 pages.
International Search Report for PCT Application No. PCT/US05/45146 dated Apr. 21, 2006, 12 pages.
International Search Report for PCT Application No. PCT/US11/61091 dated May 11, 2012, 10 pages.
International Search Report for PCT Application No. PCT/US12/36680 dated Nov. 16, 2012, 12 pages.
International Search Report for PCT Application No. PCT/US12/36684 dated Nov. 23, 2012, 1 page.
International Search Report for PCT Application No. PCT/US12/36682 dated Nov. 23, 2012, 10 pages.
Amended Complaint and Demand for Jury Trial *3M Innovative Properties Company and 3M Company* vs. *Illinois Tool Works, Inc. and ITW Finishing, L.L.C.*, Case No. 06-2459 (U.S. District Court, District of Minnesota) filed Aug. 7, 2006 (5 pgs).
Answer and Counter-Claim to amended Complaint, *3M Innovative Properties Company and 3M Company* vs. *Illinois Tool Works, Inc. and ITW Finishing, L.L.C.*, Case No. 06-2459 (U.S. District Court, District of Minnesota) filed Aug. 21, 2006 (8 pgs).
Answer of Defendants Demand for Jury Trial, *3M Innovative Properties Company and 3M Company* vs. *Louis M. Gerson Co., Inc., and Gerson Professional Products, Inc.*, Civil No. 08-04960 JRT-FLN (U.S. District Court, District of Minnesota), filed Oct. 15, 2008 (4 pages).
Complaint and Demand for Jury Trial, *3M Innovative Properties Company and 3M Company* vs. *Illinois Tool Works, Inc. and ITW DeVilbiss*, Case No. 06-2459 (U.S. District Court, District of Minnesota), filed Jun. 16, 2006 (29 pgs).
International Search Report for PCT Application No. PCT/US12/36685 dated Nov. 23, 2012, 10 pages.
International Search Report for PCT Application No. PCT/US12/36686 dated Nov. 23, 2012, 12 pages.
International Search Report for PCT Application No. PCT/US12/36687 dated Nov. 30, 2012, 12 pages.
Inter Partes Reexamination of U.S. Pat. No. 7,374,111 filed Dec. 9, 2008, issued Reexamination U.S. Appl. No. 95/000,422, 86 pages.
International Search Report for PCT Application No. PCT/US12/44648 dated Jan. 24, 2013, 11 pages.
U.S. Appl. No. 13/728,678, filed Dec. 27, 2012, entitled "Convertible Paint Cup Assembly with Air Inlet Valve".
International Search Report for PCT Application No. PCT/US2012/071843 dated Apr. 29, 2013, 11 pages.

* cited by examiner

SECTION H-H

DETAIL K

LIQUID SUPPLY ASSEMBLY

CROSS-REFERENCE TO RELATED APPLICATIONS

This application is a continuation of and claims priority to U.S. patent application Ser. No. 17/324,186, filed May 19, 2021, entitled "LIQUID SUPPLY ASSEMBLY," by Ronald L. Gerson et al., which is a continuation of and claims priority to U.S. patent application Ser. No. 16/049,292, filed Jul. 30, 2018, entitled "LIQUID SUPPLY ASSEMBLY," by Ronald L. Gerson et al., now U.S. Pat. No. 11,040,360, which is a continuation-in-part (CIP) and claims priority to U.S. patent application Ser. No. 14/093,122, filed Nov. 29, 2013, entitled "LIQUID SUPPLY ASSEMBLY," by Ronald L. Gerson et al., now U.S. Pat. No. 10,035,156, which is a continuation of and claims priority to U.S. patent application Ser. No. 13/268,340, filed Oct. 7, 2011, entitled "LIQUID SUPPLY ASSEMBLY," by Ronald L. Gerson et al., which is a divisional of and claims priority to U.S. patent application Ser. No. 11/762,890, filed Jun. 14, 2007, entitled "LIQUID SUPPLY ASSEMBLY," by Ronald L. Gerson et al., now U.S. Pat. No. 8,033,413, which claims priority to U.S. Provisional Application No. 60/828,245, filed Oct. 5, 2006, entitled "LIQUID SUPPLY ASSEMBLY," by Ronald L. Gerson et al., and also claims priority to U.S. Provisional Application No. 60/815,142, filed Jun. 20, 2006, entitled "CONNECTOR SYSTEM FOR A SPRAY GUN LID," by Ronald L. Gerson et al., the disclosures of which are incorporated herein by reference in their entireties.

BACKGROUND

Field of the Disclosure

The present disclosure is directed to paint spray gun systems, particularly to liquid supply assemblies for paint spray gun systems.

Description of the Related Art

Spray guns are widely used for rapidly coating surfaces with liquids, such as paint. Liquid is contained in a container that attaches to the gun. The outlet of the container is typically a releasably connectable coupling that connects to the spray gun. Liquid flows from the container into the spray gun and is fed to a spray nozzle. The spray nozzle combines the liquid with air, atomizing the liquid, forming a spray. At the end of the spraying operation, the container and the mating connection to the spray gun must be thoroughly cleaned so that liquid from one operation does not contaminate the liquid to be sprayed in the next spraying operation. Additionally, the coupling between container and spray gun must not retain any dried liquid that might interfere with the connection between container and spray gun. A container with a disposable liner and lid may be used advantageously to eliminate or reduce the labor required to clean the container and the coupling to the spray gun. A spray gun system with a disposable liner is described in U.S. Pat. No. 6,820,824 to Joseph et al. Other spray gun systems with liners are described in U.S. Pat. No. 3,432,104 to Kaltenbach; U.S. Pat. No. 4,151,929 to Sapien; and U.S. Pat. No. 5,816,501 to Lopresti. Systems utilizing disposable liners can include removable filters as well. However, user error can cause erroneous assembly which can lead to particle contamination from unfiltered paint. Additionally, removable filters can lead to paint contamination as the filter is transferred out of the spray gun system for disposal. Moreover, removable filters disposed between a liner and lid can interfere with the fluid dynamics and suction of the liquid if the removable filter is misaligned. Other systems utilize a filter integral with the lid. However, integral filters in such spray gun systems are limited to hard cup designs that do not incorporate a disposable liner. As such, a need exists for a spray gun system that safeguards against erroneous assembly and paint contamination.

Accordingly, the industry continues to need improvements in paint spray gun systems and liquid supply assemblies for paint spray gun systems.

BRIEF DESCRIPTION OF THE DRAWINGS

The present disclosure can be better understood, and its numerous features and advantages made apparent to those skilled in the art by referencing the accompanying drawings.

FIG. 6B includes a side plan view of the container liner of FIG. 6A; the other side view is similar;

The use of the same reference symbols in different drawings indicates similar or identical items.

DETAILED DESCRIPTION

In various embodiments disclosed herein, a connector system is provided for releasably attaching a spray gun to a liquid container. The connector system includes a liquid container lid with a liquid outlet, an adapter with two ends and interlocking tab assemblies flexibly attached to the lid. One end of the adapter connects to the spray gun liquid inlet port and the other end of the adapter connects to the liquid outlet in the container lid. The adapter ends are joined by a liquid-tight passageway. Interlocking tab assemblies on the top of the lid releasably clamp the adapter to the top of the container lid.

Each tab assembly includes a pair of tabs. Each tab is flexibly attached at one end of the tab to the lid top. One tab of each assembly includes an end shaped to securely clamp the adapter to the lid without the need to rotate the adaptor. This clamping tab is free to flex about its attachment point to the lid and includes a hole near the middle of the tab. The end of the second tab of the interlocking tab assembly is formed to fit through the hole in the clamping tab, releasably engaging the tabs. The second tab of the interlocking tab assembly includes a structure adapted to lock the clamping tab in position with respect to the adapter. This locking tab is formed to flex only slightly about its attachment to the lid, thus maintaining the clamping tab in engagement with the adapter, when the tabs are interlocked. Other means for engaging the tabs in each tab assembly may be used such as a snap closure, a hook and eye, etc. as are known to those skilled in the art.

By way of example and not by way of limitation, the connector system may be used with any of the liquid containers described in co-pending U.S. patent application Ser. No. 11/302,970, entitled "Liquid Container System for a Spray Gun," which is incorporated herein by reference, by appropriate adaptation of the shape of the lid and the locking hinges that attach the lid to the container.

Figure 1:
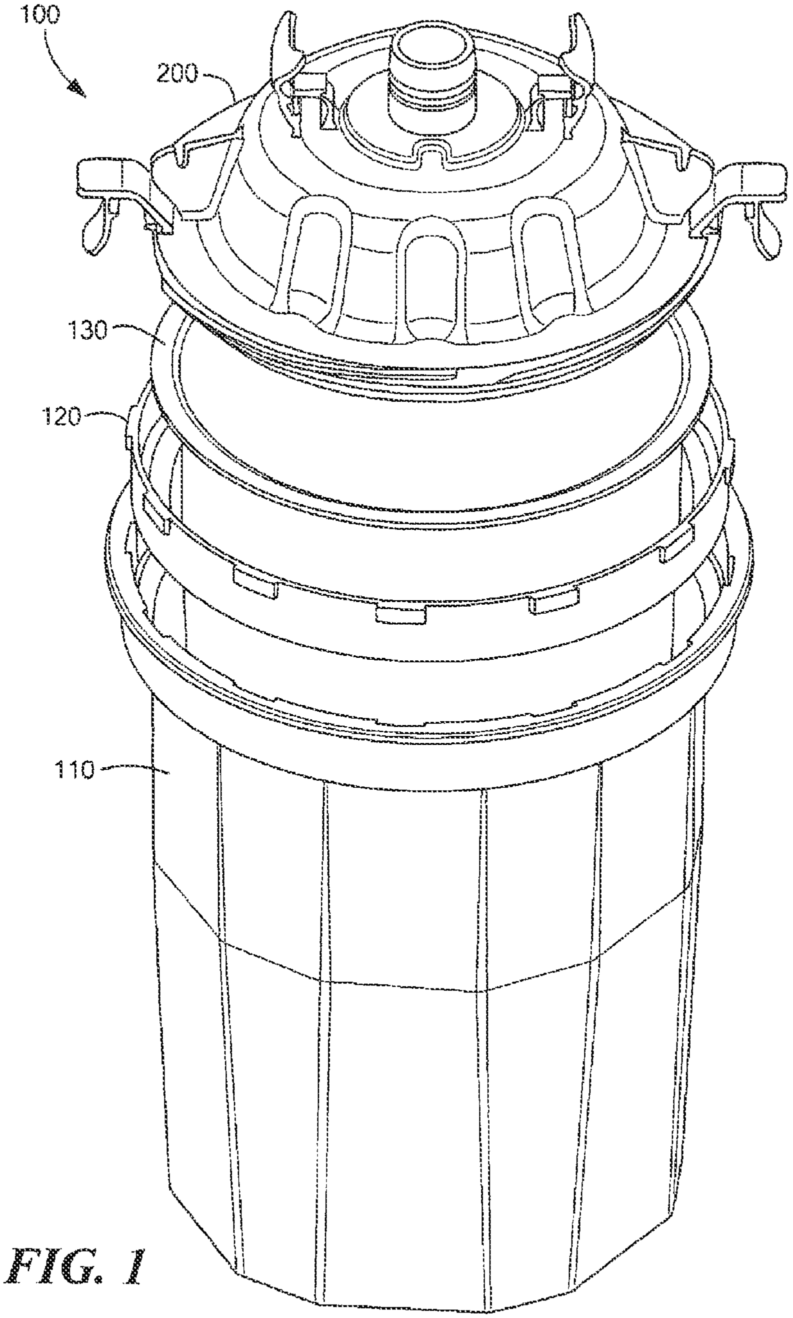
FIG. 1 includes an exploded perspective view of a liquid container system that includes the connector system in accordance with an embodiment.

FIG. 1 includes an exploded view of a four piece container system in which the connector system disclosed herein can be advantageously applied in accordance with an embodiment. The connector system attaches the container system to a spray gun for spraying a liquid. The container system includes an outer support cup 110, a unitizing ring 120, a liner 130 and a lid 200. The unitizing ring is inserted into a recess in a flange at the top of the outer cup.

A disposable, collapsible liner is inserted through the ring into the outer cup and a lip at the top of the liner is supported on the unitizing ring. The lid includes a projection that slides into the opening at the liner top. The lid screws into the unitizing ring and a flange or a flexible sealing gasket on the periphery of the lid presses the liner lip against the unitizing ring, forming a liquid tight seal. A "unitizing" ring means a ring that in combination with other components (here a liner and lid) allows the combination to be manipulated as a unit. Thus, the lid-ring-liner assembly may be removed from the outer cup as a liquid-tight unit, without the danger of the liquid-filled liner separating from the lid. When the lid is installed on the unitizing ring, the lid-ring-liner assembly may be secured to the outer cup with a locking mechanism.

Figure 2:
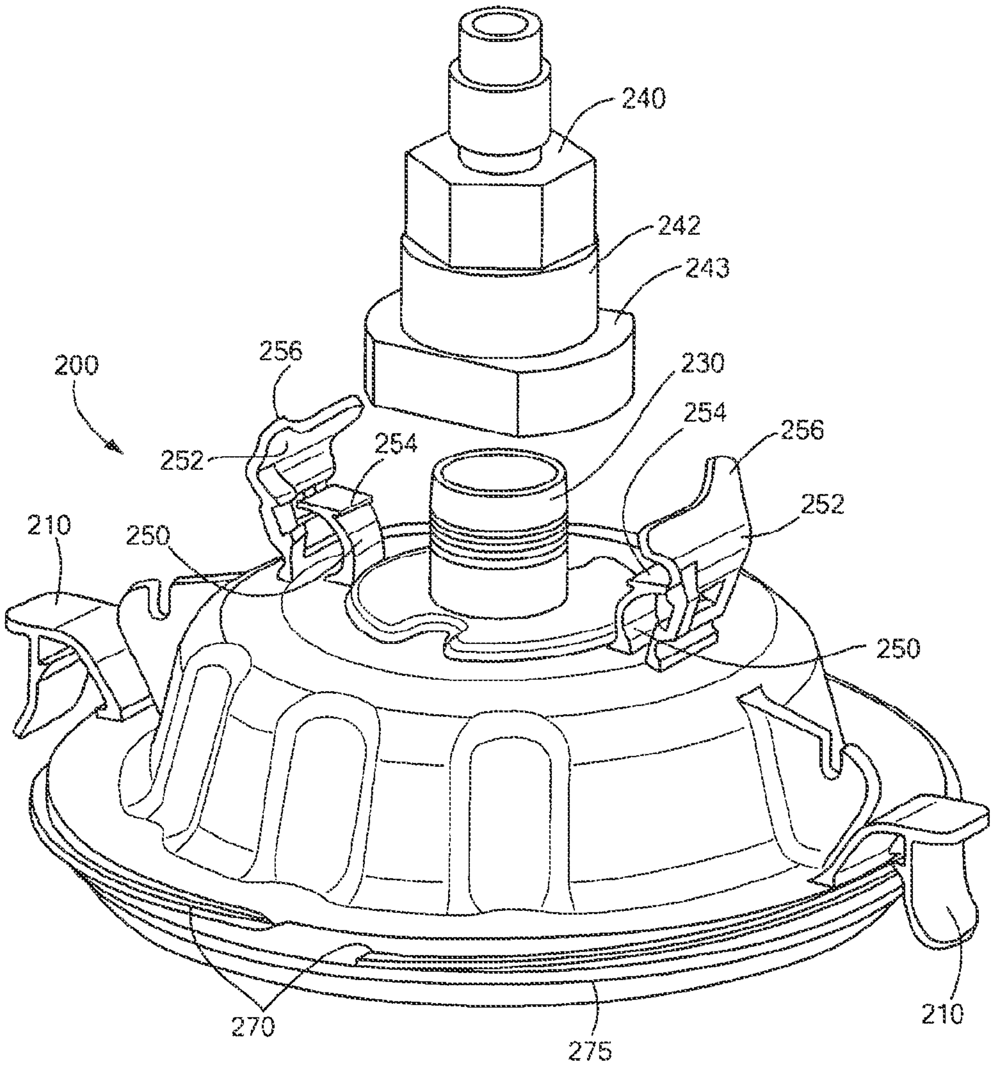
FIG. 2 includes an exploded perspective view of the connector system in accordance with an embodiment.
Figure 3:
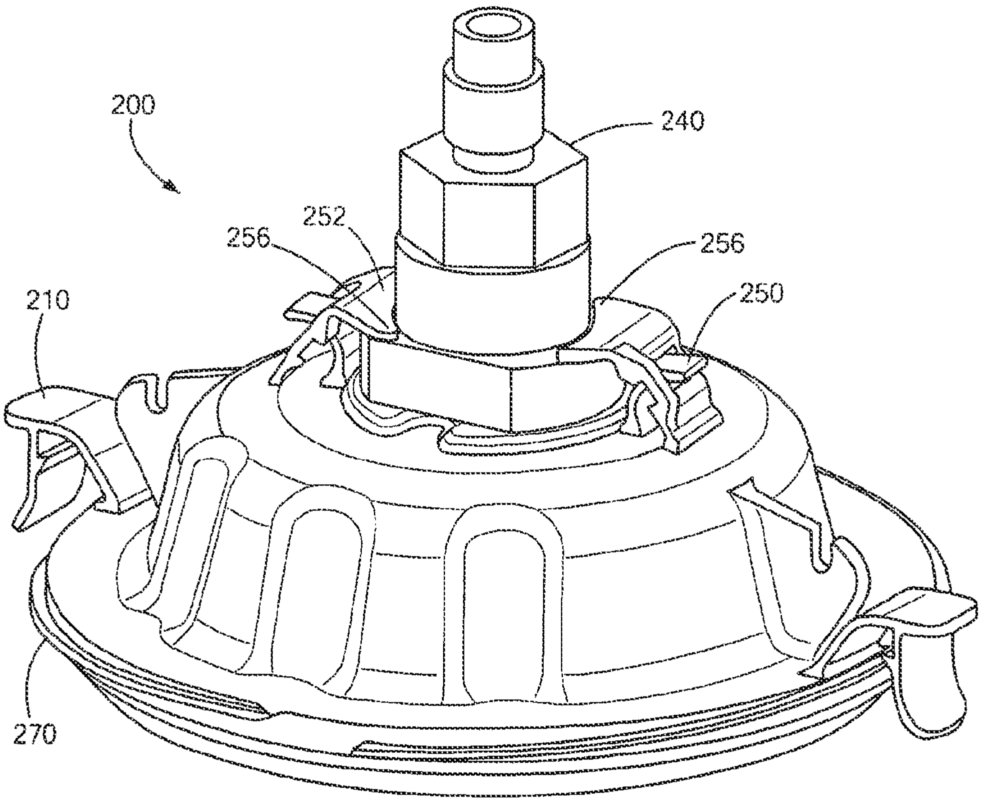
FIG. 3 includes a perspective view of the connector system of FIG. 2 with the adapter installed on the lid outlet and the interlocking tabs in an engaged position.
Figure 5:
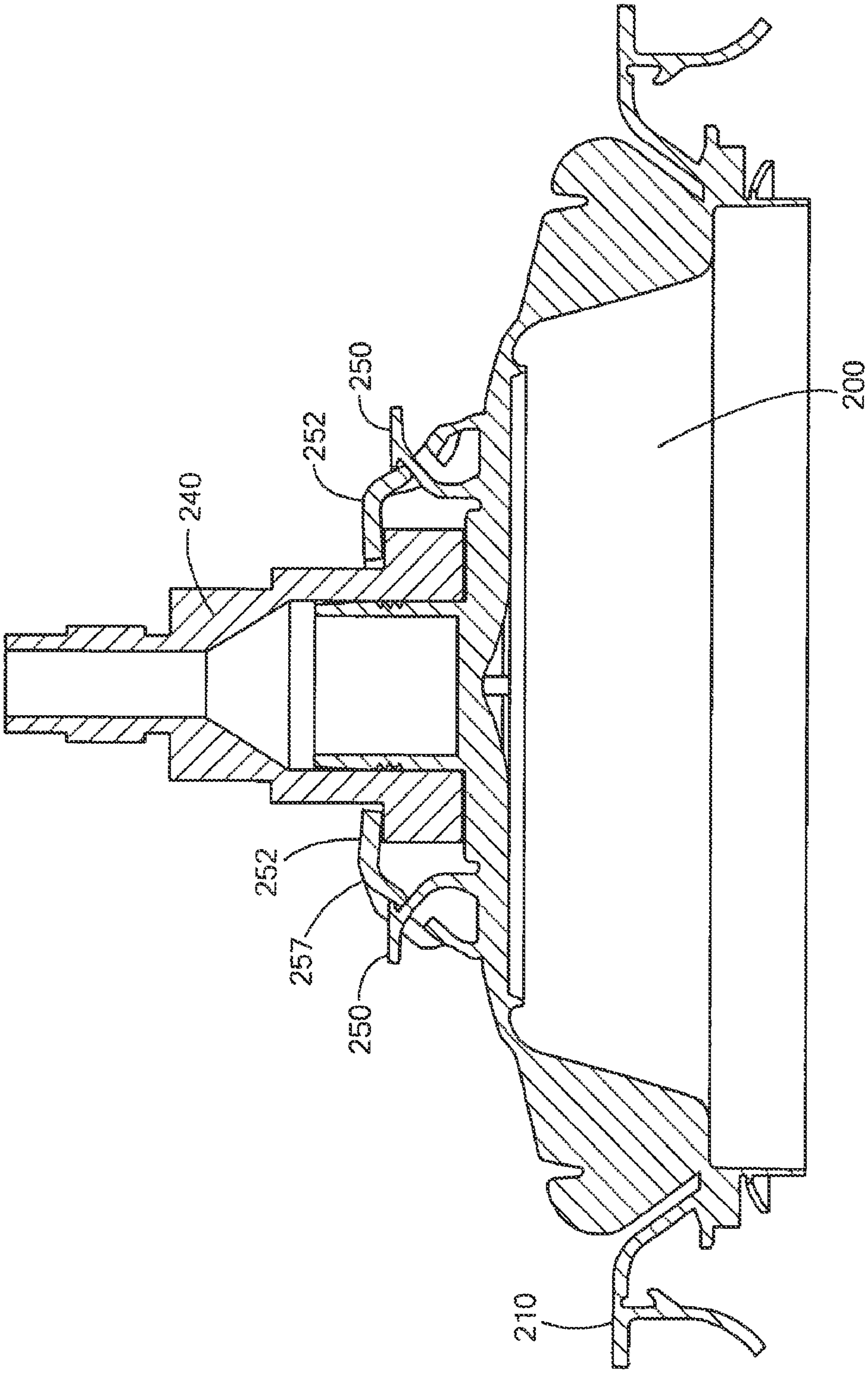
FIG. 5 includes the cross sectional view of FIG. 4 with the interlocking tabs engaged.

In particular embodiment, as depicted in FIG. 2, a connector system is provided that includes a lid 200 and an adapter 240. The lid 200 covers the top of a liquid container that includes an outer cup 110. The lid 200 is inserted into the outer cup 110 and attached to the outer cup by, for example, locking clips or hinges 210 on the periphery of the lid. The lid includes a generally cylindrical liquid outlet 230 in the top of the lid. One end of the adapter 240 connects to the spray gun liquid inlet port (not shown) and the other end of the adapter connects to the liquid outlet 230 in the lid 200. The adapter ends are joined by a liquid-tight passageway. Interlocking tab assemblies (250-252) are attached to the lid 200. When these tab assemblies (250-252) are in an interlocked configuration, the end 256 of tab 252 presses on adapter ledge 243 and clamps the adapter to the liquid outlet 230 of the lid 240, as can be seen in FIGS. 3 and 5. Thus, the adapter is securely fastened to the lid, facilitating use of the spray gun and liquid container in various orientations.

The interlocking tabs assembly (250-252) is illustrated in FIG. 2 in a non-interlocked configuration. The tab 252 will be called the "clamping" tab because this tab engages the adapter. The clamping tab 252 is biased open (away from the adapter). The tab 250 will be called the "locking" tab because this tab locks the clamping tab into position. The clamping tab 252 includes a hole for receiving an end of the locking tab 250. The hole in the clamping tab 252 and the corresponding end of the locking tab 250 must be shaped in a complementary fashion so that the tab 250 end slides into and through the hole in the clamping tab 252. In a particular aspect, the hole in the locking tab is generally rectangular in shape.

To engage the tabs, a user pushes the clamping tab 252 towards the attached adapter, which threads the locking tab 250 into and though the hole in the clamping tab 252. The locking tab 250 is formed to flex only slightly about its attachment to the lid, thus facilitating engagement of the locking and clamping tabs. This user action engages the tabs of the interlocking tab assembly. The end of each clamping tab 256 presses on the adapter ledge 243 and, thus, clamps the adapter 240 to the lid 200, as illustrated in FIG. 3. Further, the minimal flex of the locking tab 250 maintains the clamping tab end 256 in secure engagement with the adapter, when the tabs are interlocked. The locking tab includes a locking structure, such as the ridge 254 depicted in FIG. 2, to prevent the engaged tabs from separating, by catching the locking structure 254 on the edge of the locking tab hole. The clamping tab 252 may be unlocked from the locking tab by applying downward pressure to the locking tab 250, releasing the locking structure 254 from the hole. The clamping tab 252 will tend to spring away from the adapter to its original position. The adapter may then be removed from the liquid outlet.

Figure 4:
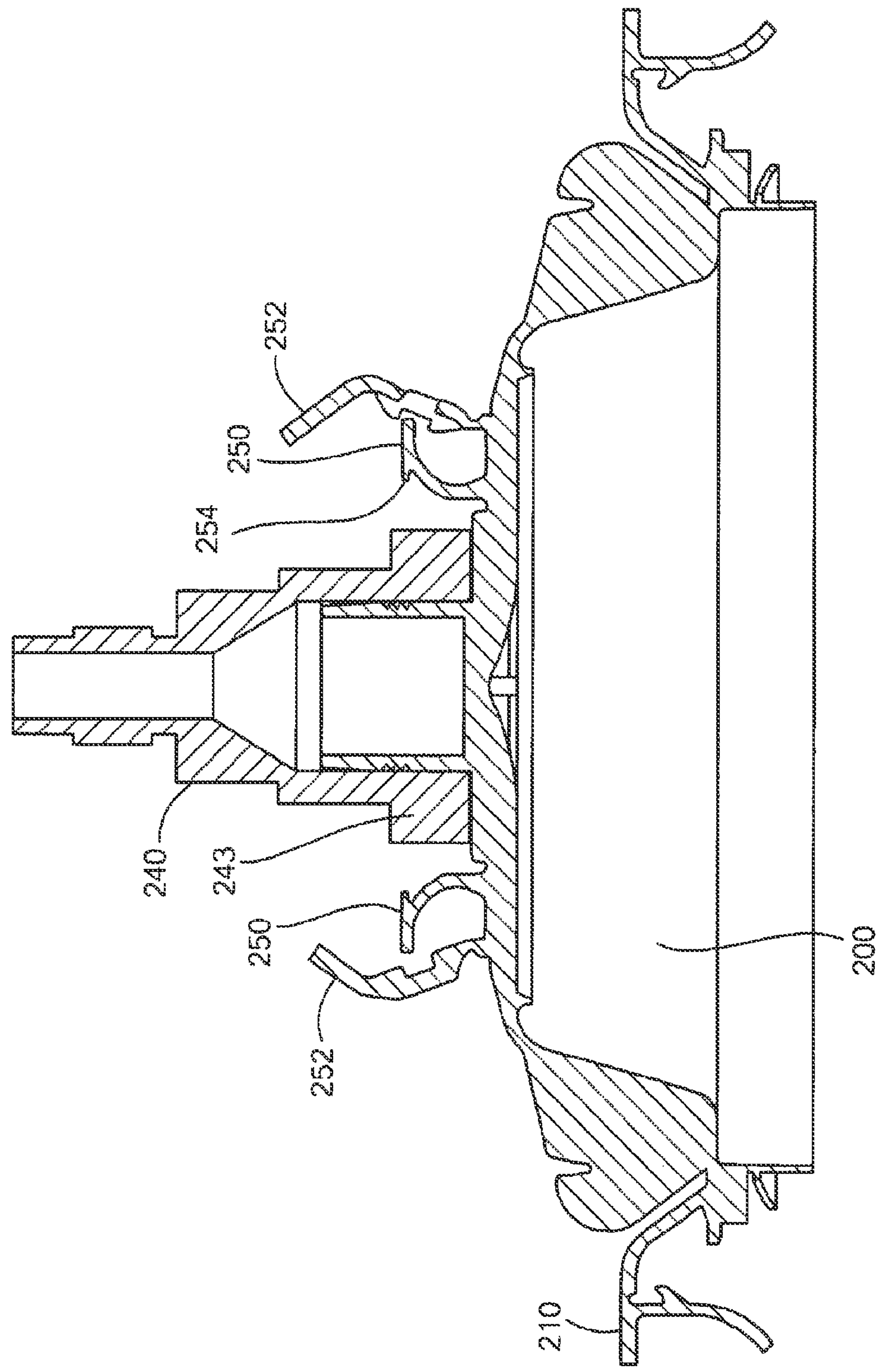
FIG. 4 includes a cross sectional view of the connector system of FIG. 2 with the adapter installed on the lid outlet and the interlocking tabs disengaged.

FIG. 3 depicts the interlocking tab assemblies (250-252) in an interlocked configuration. The end 256 of the clamping tab 252 presses on the adapter ledge 243 to clamp the adapter 240 to the lid outlet 230. Note the shape of the end 256 of the clamping tab 252. The end 256 of the locking tab 252 is curved to provide a snug fit to the curved portion 242 of the adapter 240 that it contacts, regardless of the position of the adaptor. Thus, in this embodiment, the adapter will remain securely engaged with the liquid outlet for any orientation of the adapter with respect to the liquid outlet, when the adapter is rotated. FIGS. 4 and 5 illustrate a cross-sectional view of the connector assembly system with the interlocking tab assemblies open and closed, respectively. Note in FIG. 4 the bend in the clamping tab 257 between the point where the clamping tab attaches to the lid and the end of the tab 256 that contacts the adapter 240. In certain embodiments, the bend 257 in the tab is sufficiently acute that the locking tab flexes at the bend 257 as the tab end 256 contacts the adapter ledge 243. This flex aids in clamping the adapter to the lid.

Two interlocking tab assemblies are shown on the container lid in FIGS. 2-5, but other embodiments of the connector system may have more than two interlocking tab assemblies. Further, other means for engaging the tabs in each tab assembly may be used such as a snap closure, a hook and eye, etc., as are known to those skilled in the art.

In particular embodiments, the lid 200 and interlocking tab assemblies (250-252) are injection molded as a single piece, according to techniques known in the art. In a preferred embodiment, the lid and tab assemblies are made of polypropylene. In other embodiments, other materials that are suitable for injection molding may be used. The lid and interlocking tab assemblies are shaped to facilitate release of the molded part from the mold.

Figure 6A:
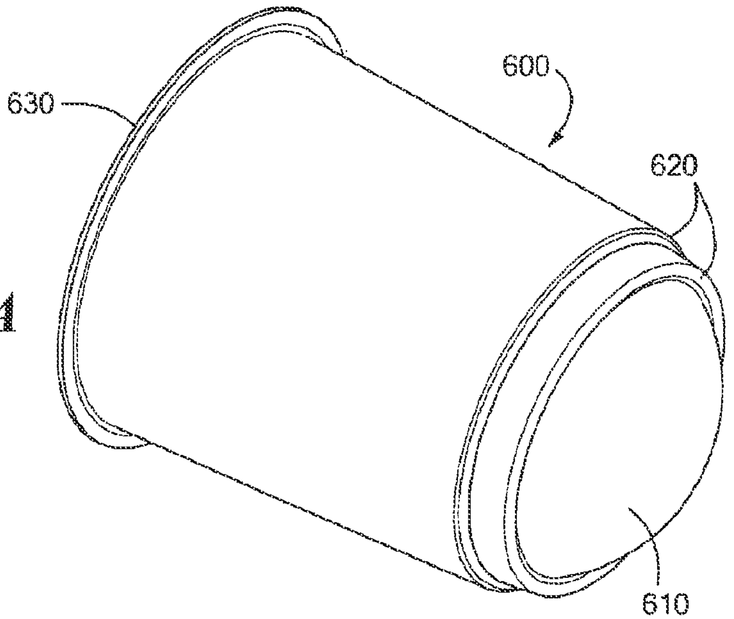
FIG. 6A includes a perspective view of the top and side of a container liner in accordance with an embodiment.
Figure 6B:
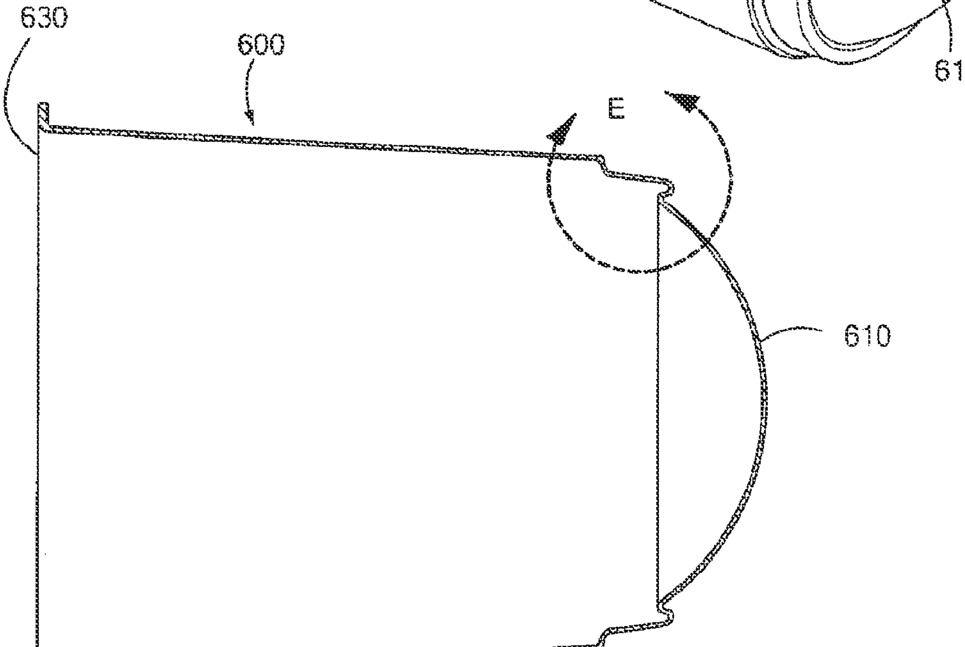
Figure 6C:
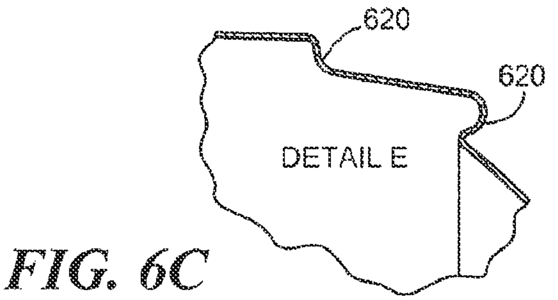
FIG. 6C includes detail of a portion of the liner in FIG. 6B as identified by letter E.
Figure 7:
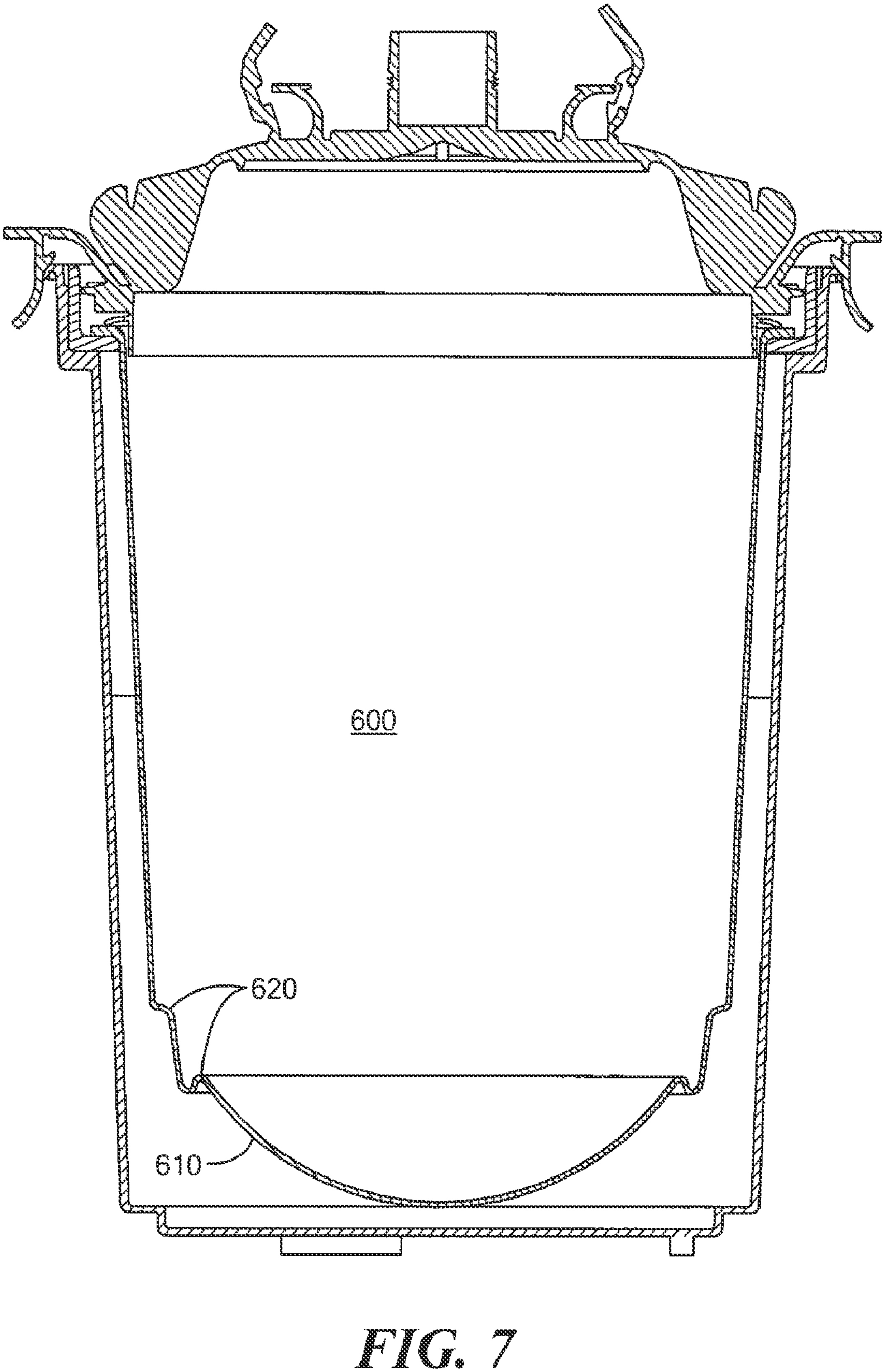
FIG. 7 includes a cross-sectional view of the liner of FIGS. 6A-6C installed in an outer cup.

In another embodiment, as depicted in FIGS. 6A-6C, a disposable liner 600 is provided for use in a liquid container system, such as, for example the container system 100 described in conjunction with FIG. 1. The liner has a non-flat closed end 610, an open end 630 for introducing liquid into the liner and one or more horizontal pleats 620 at the closed end. The liner can be made from any nonporous material, including, but not limited to, polyethylene, polypropylene, or a flexible film. The liner may be rigid or collapsible. In certain embodiments, the liner sidewalls may be thicker than the liner bottom, facilitating storage of liquid in the liner. FIG. 7 depicts a cross-sectional view of the liner 600 installed in an exemplary liquid container system. The disposable liner facilitates cleaning of the container system after use.

Figure 8A:
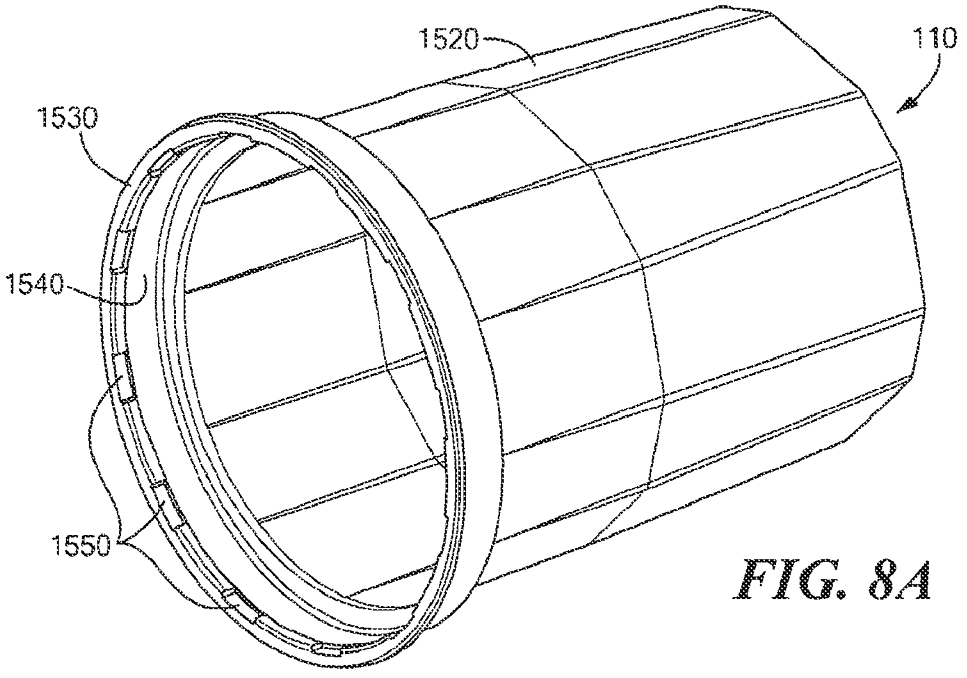
FIGS. 8A-C includes an outer cup for a four piece liquid container system, for the embodiment of FIG. 1.
Figure 8B:
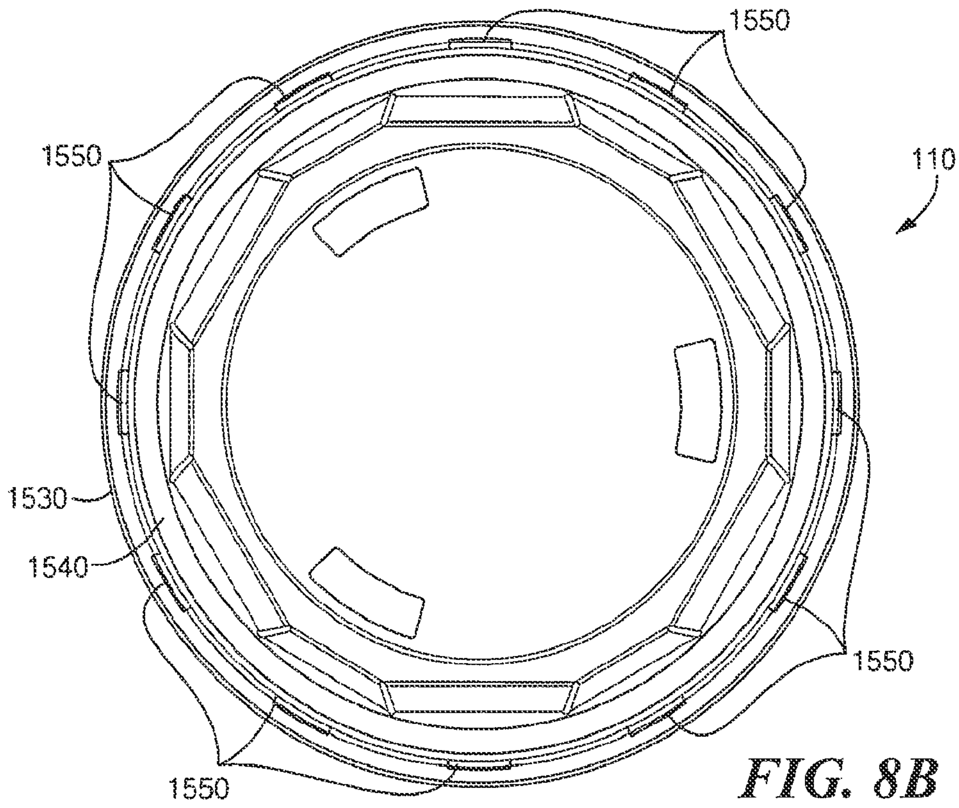
Figure 8C:
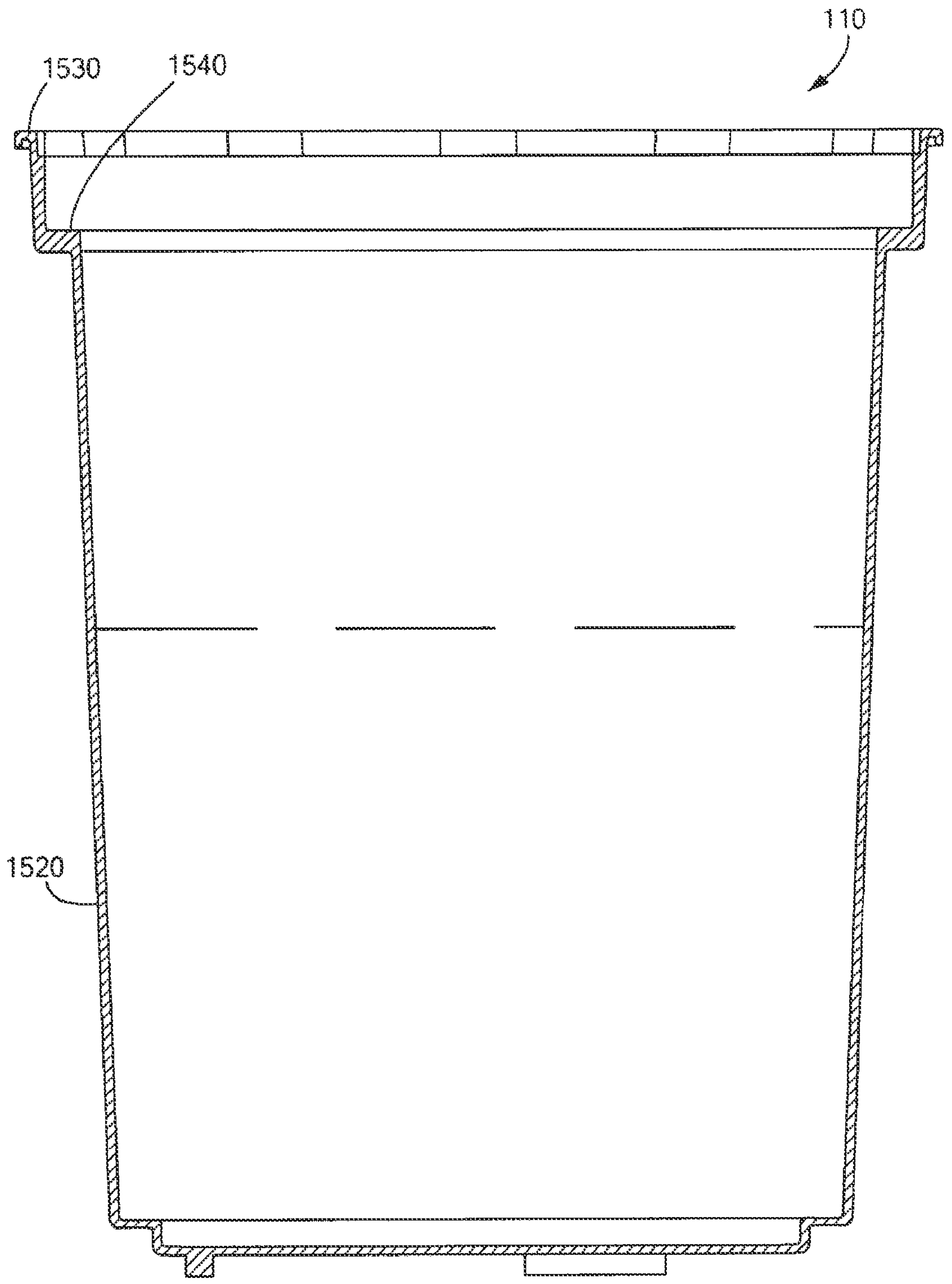

As described above, FIG. 1 illustrates an exploded view of a four piece container system in which the connector system disclosed herein can be advantageously applied. FIG. 8A includes a perspective view of the outer cup 110. The cup is generally cylindrically shaped. The outer cup is made of a relatively stiff material, such as a polymeric material, which provides structural stability. In the embodiment illustrated in FIG. 8A, the outer wall 1520 of the cup includes facets to facilitate a secure grip of the outer container by the user. In general, however, the outer wall of the outer cup may be implemented with any generally cylindrical shape. The outside and inside bottom of the cup may be flat or may be other than flat. The top of the outer cup includes a generally cylindrical lip 1530 that is concentric with the longitudinal axis of the outer cup. FIG. 8B includes a plan view of the cup lip 1530 as viewed from above. The lip 1530 includes an indentation or recess 1540. This recess 1540 receives and supports the unitizing ring-liner assembly, as will be described below. The cup lip included slots 1550 in the lip's face which is interior to the cup. As will be described below, tabs in the ring may engage the slots 1550 in the lip's face to prevent mutual rotation of the ring with respect to the cup. FIG. 8C depicts the outer cup in cross section. In particular embodiments, the outer cup includes one or more openings in the cups closed end or sidewall to prevent vacuum formation and to allow paint to be expelled from the container system.

Figure 9A:
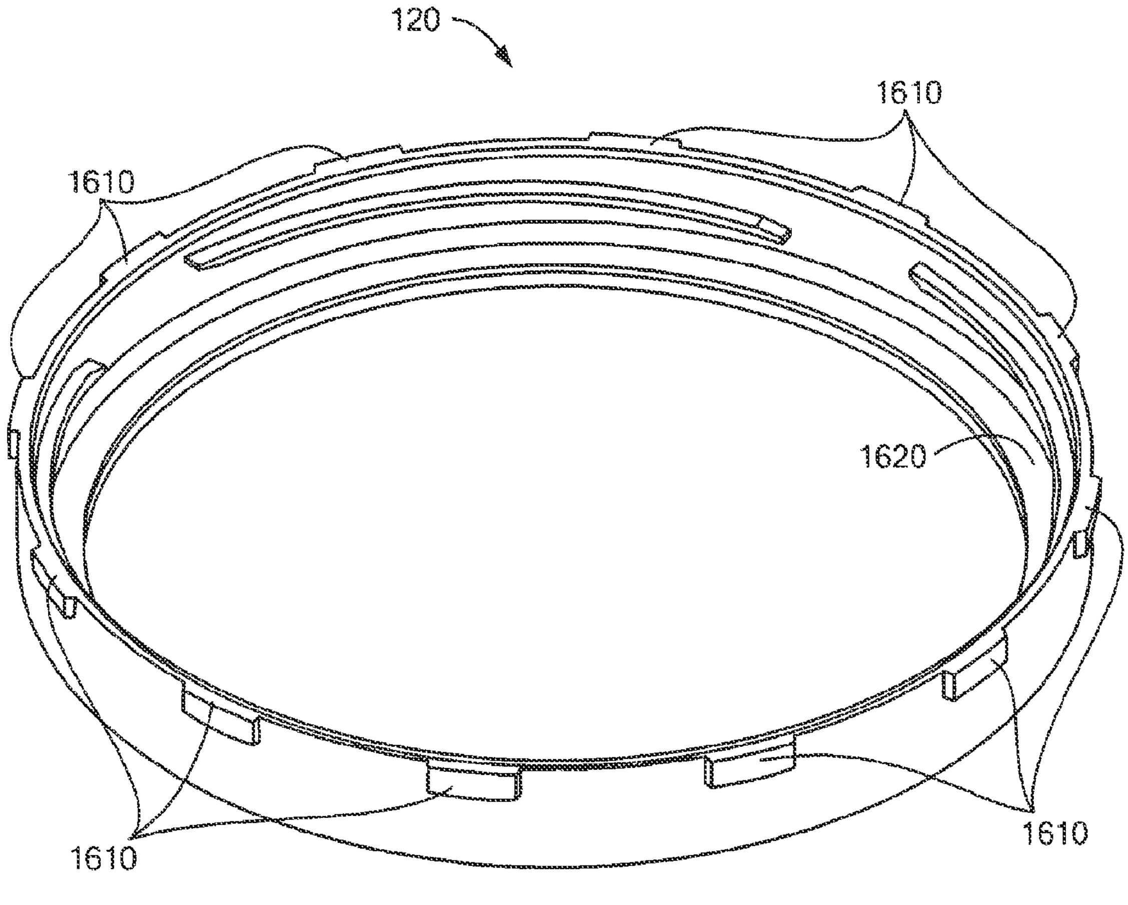
FIGS. 9A-C includes a unitizing ring for supporting a liner within the outer cup of the embodiment of FIG. 1.
Figure 9B:
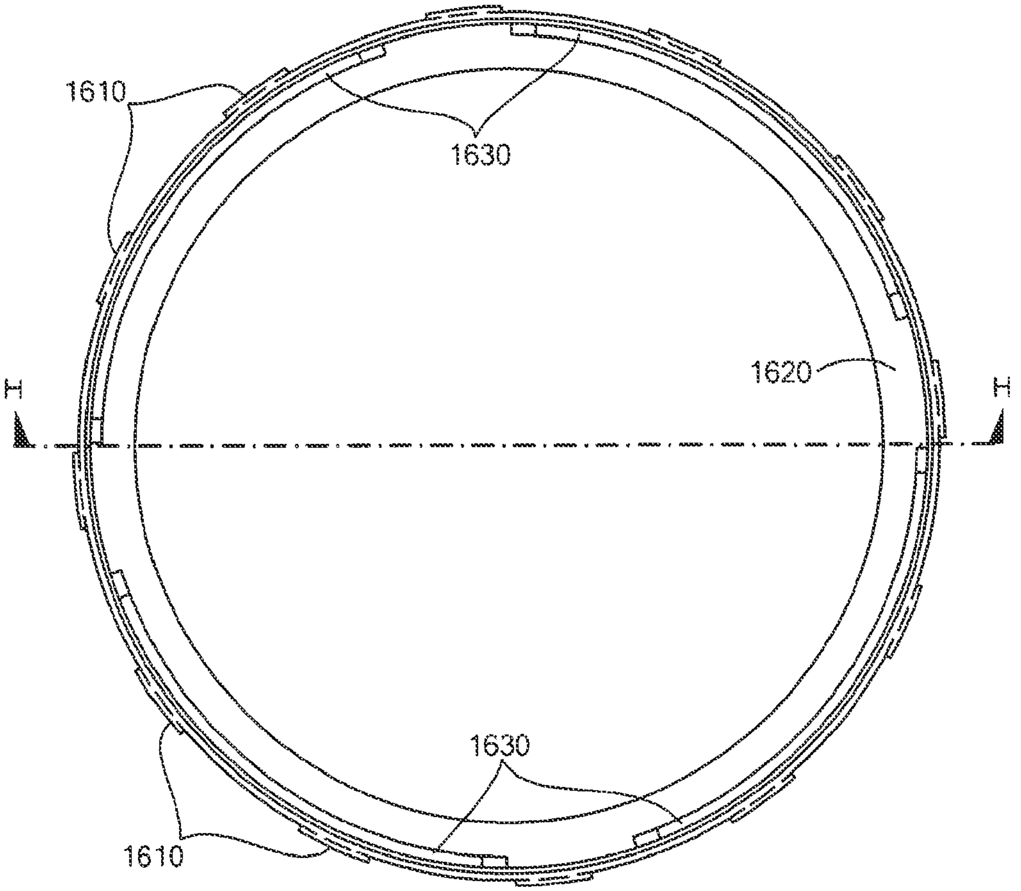
Figure 9C:
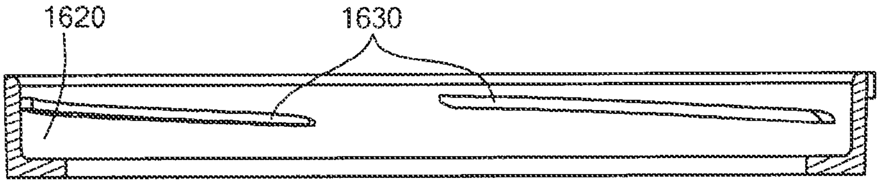

FIGS. 9A-C illustrate a unitizing ring 120, according to an embodiment of the four piece liquid container system. FIG. 9A depicts the ring 120 in a perspective view. The ring is generally annular in shape with the periphery of the annulus shaped to match the recess 1540 in the lip of the outer cup 110. The ring includes tabs 1610 extending outward from the top of the ring such that the tabs 1610 mate with slots 1550 in the top of the outer cup to prevent rotation of the ring with respect to the cup. The ring 120 includes a recess 1620 for receiving and supporting a lip at the open end of the liner, as will be described below. The ring recess 1620 is annular in shape with a circular periphery, but, in general, may assume any shape that corresponds to the shape of the lip of the liner. The inside of the unitizing ring includes rib segments 1630 that extend inwardly from the inner wall of the ring. These rib segments 1630 are generally parallel to the plane of the ring 120 and may be pitched slightly downwardly toward the cup end of the ring to act as screw threads for securing a lid to the ring.

FIG. 1 illustrates, in perspective, as described above, the components that may be included in a four piece liquid container system in accordance with an embodiment. These components are further described in conjunction with FIGS. 8-10. The unitizing ring 120 is inserted into the recess in the lip at the open end of the outer cup 110. A liner 130 is inserted into the unitizing ring, with a lip at the top of the liner resting on a recess 1620 in the ring (see FIG. 9A). A removable lid 200, as depicted in FIG. 10, includes a bottom projection 280 that is inserted into the open end of the liner, after liquid has been poured into the liner. The lid 200 is adapted to contain paint or other liquid within the liner and to prevent air from entering the closed lid/liner combination. Such closure occurs when the spray gun is attached to the assembly for use, or when the container outlet is sealed with a removable cap or plug. The removable cap or plug is used to seal the filled assembly either in preparation for forthcoming use or to store unused paint for future use. The underside of a flange 285 on the periphery of the lid forces the lip of the liner to the recess in the unitizing ring, enabling a liquid-tight seal. In certain embodiments, the diameter of the lid bottom projection 280 and the inner diameter of the ring recess 1620 are such that the top of the sidewall of the liner is compressed when the lid is attached to the unitizing ring. Compression of the liner sidewall between lid bottom projection 280 and ring recess 1620 in this embodiment aids in forming a liquid tight seal. The lid bottom projection 280 and the inner edge of the ring recess 1620 may both be tapered to aid in assembly of the liner, lid, and ring. Tabs or threads 270 at the edge of the lid allow the lid to be screwed into rib segments or threads 1630 on the unitizing ring, securing the lid to ring. A locking mechanism 210 on the lid can secure the lid to the outer cup 110, allowing the liquid container system to be oriented in any direction without detachment of the outer support cup from the system. The securing hinges 210 clip over a flange on the outer cup 110. The tabs are flexibly hinged and biased to snap onto the flange of the outer cup. The lid has an outlet 230 of generally cylindrical shape so that liquid may be transferred from outer cup to the spray gun. The lid outlet, an adapter for connection to a spray gun that mates thereto and means for securing the adapter to the outlet may be constructed as described above in connection with FIGS. 2-5. The locking mechanism depicted for connecting the lid to the outer cup is by way of example only and a variety of such mechanisms can be used to secure the lid to the cup.

The liner illustrated in FIGS. 6A-6C and described herein may be employed in various embodiments of the four piece liquid container system. A liner for use in the system, in general, will be: liquid tight; open-ended with a lip surrounding the open end, so that the lip may be supported by the recess in the unitizing ring and the lip may be pressed by the compressible flange 285 of the removable lid against the ring recess 1620.

In certain embodiments, the four piece liquid container may be coupled with either a gravity feed or a suction feed spray gun, with the outlet of the lid connected to the inlet port of the gun by an adapter, such as the adapter described above. Liquid is withdrawn from the container and fed to the spray nozzle. The gun may be oriented in a wide range of orientations, including an inverted orientation with respect to gravity.

Figure 10A:
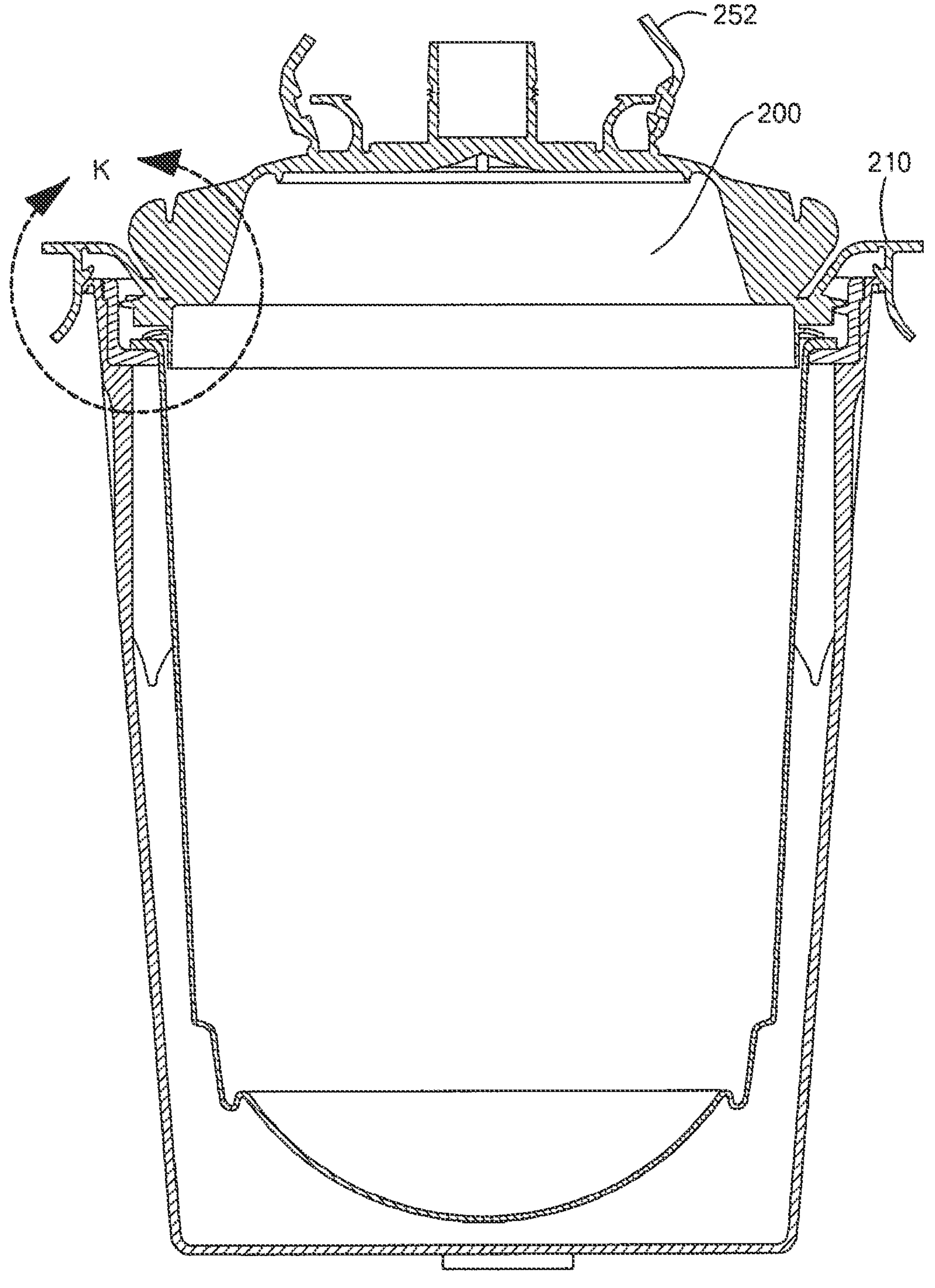
FIGS. 10A-B includes a lid with a flexible sealing gasket in accordance with an embodiment.
Figure 10B:
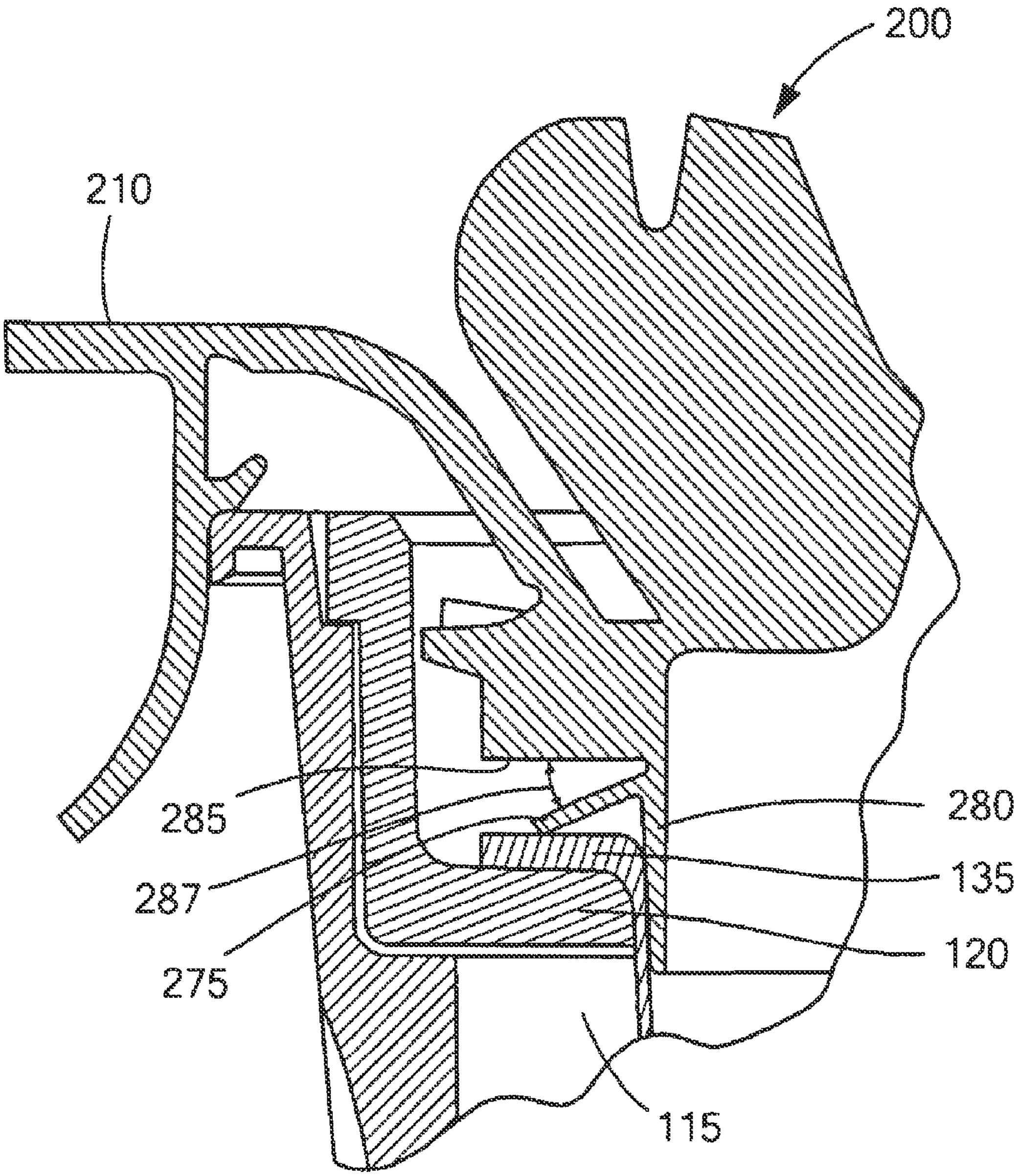

In a particular embodiment, an integrated, compressible flexible sealing gasket is provided at a peripheral edge of a removable container lid in a four piece liquid container system. This sealing gasket forms a liquid tight seal between the lid, liner, and ring. The liquid container system may be generally similar, for example, to the system described above in connection with FIGS. 1-5 and FIGS. 7-9. FIG. 10A includes a cutaway side view of a four piece container system, employing a flexible sealing gasket on the lid. The sealing gasket 275 is a downward flaring circumferential projection extending from the underside of the flange on the periphery of the lid 285 or from top of the lid bottom projection 280. FIG. 10B illustrates the detail of the lid-liner-unitizing ring attachment, labeled "K" in FIG. 10A. The lid 200 screws into the unitizing ring 120 and the downward flaring flexible sealing gasket 275 presses the liner lip 135 against the unitizing ring 120, forming a liquid tight seal. The lid projection 280 may press the liner sidewall against the reservoir sidewall 115, as indicated, or the dimensions of the lid projection 280 may provide clearance between the lid projection and the liner sidewall ensuring easy insertion of the lid projection into the liner (and reservoir) top. The compressible flexible sealing gasket may be formed by injection molding, for example, as the lid is manufactured, avoiding the cost of a separate extra gasket and the complexity of an additional part. In a particular embodiment, the thickness of the sealing gasket is about 0.020 inches, allowing the lip to flex as the lip presses the liner to the ring. In other preferred embodiments, the angle 287 between the flexible sealing lip and the underside of the lid flange 285 at the periphery of the lid is about 30 degrees.

Figure 11A:
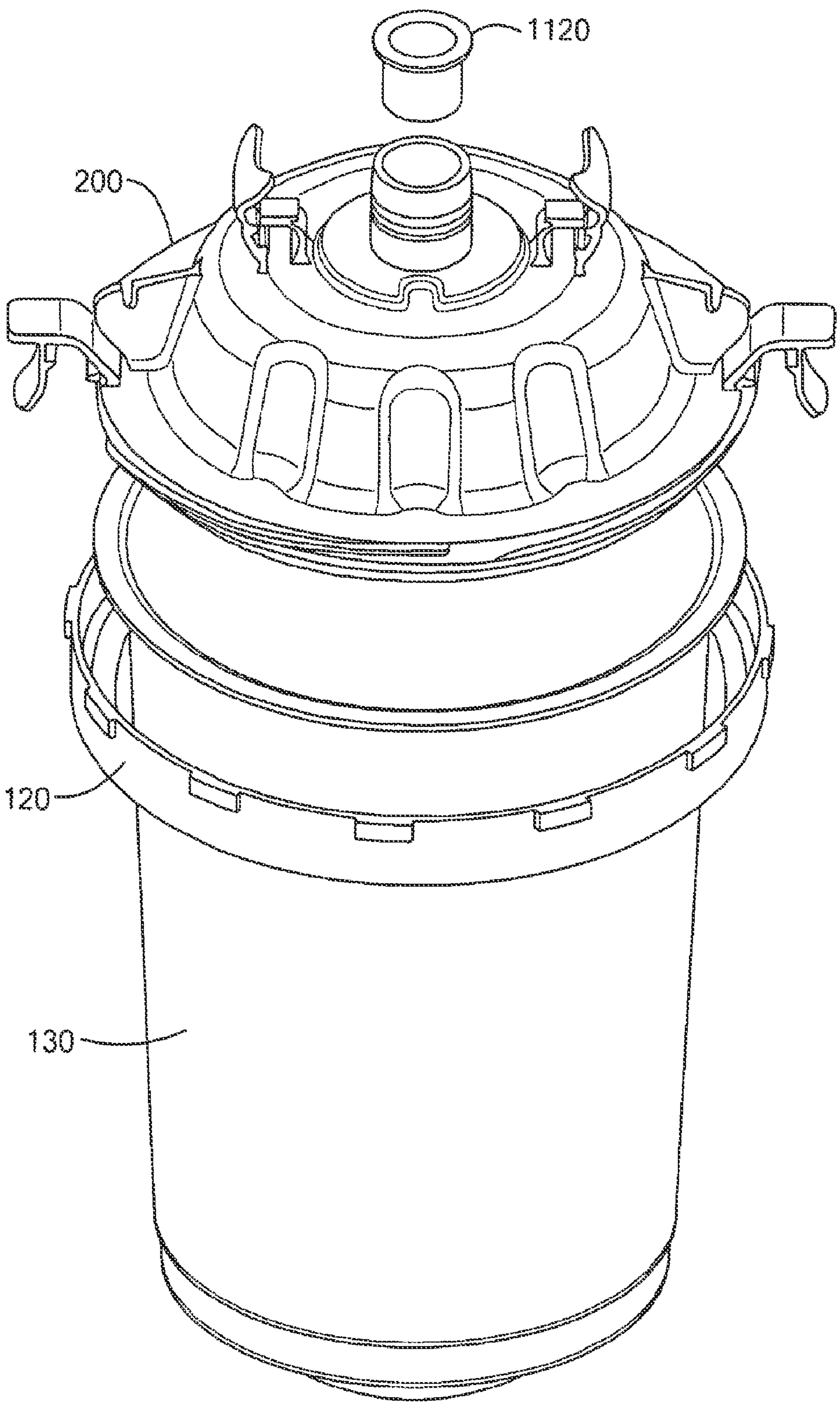
FIGS. 11A-B illustrate a unitized lid-ring-liner combination for storing liquid in accordance with an embodiment.
Figure 11B:
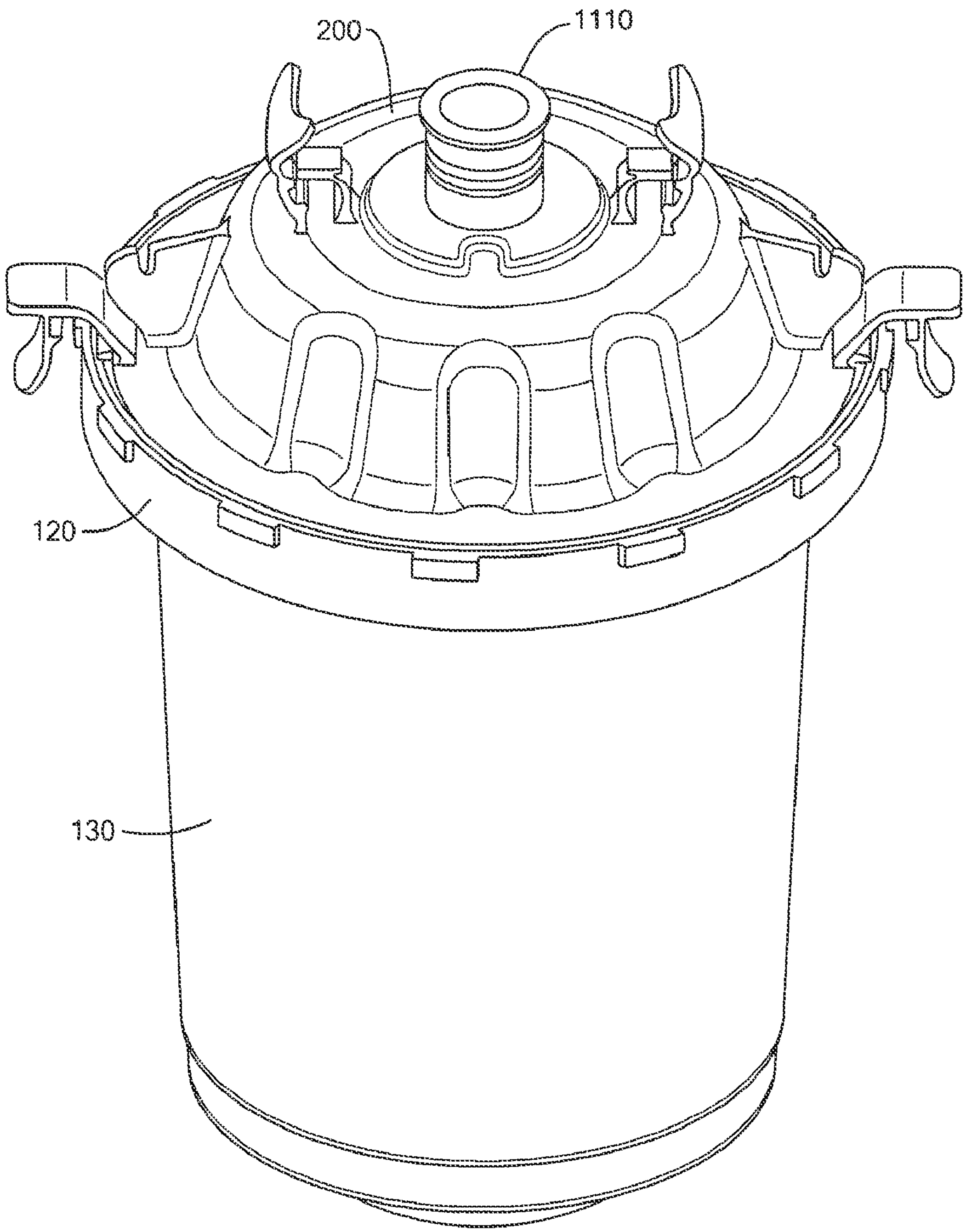

As illustrated in FIG. 11, the unitized ring-lid-liner combination may be manipulated as a liquid-tight unit, e.g., inserted into and removed from the outer cup. FIG. 11A includes an exploded view of the combination, while FIG. 11B depicts the combination assembled. When the combination of FIG. 11B is removed from the cup, the liquid outlet in the lid may be closed with a removable cap or stopper 1110. Advantageously, used paint can be stored and saved without the need for an outer cup. Since a paint shop may have numerous stored paint containers, eliminating the need for an outer cup can provide considerable cost savings. Similarly, paint can be mixed and store temporarily without an outer cup for later use. Further, in disposing of a container with liquid remaining, the unitized system eliminates the danger of the lid separating from the liner as the unit is lifted from the outer cup or as it is tossed into a disposal can. This system eliminates a fire hazard when the liquid is flammable.

Figure 12:
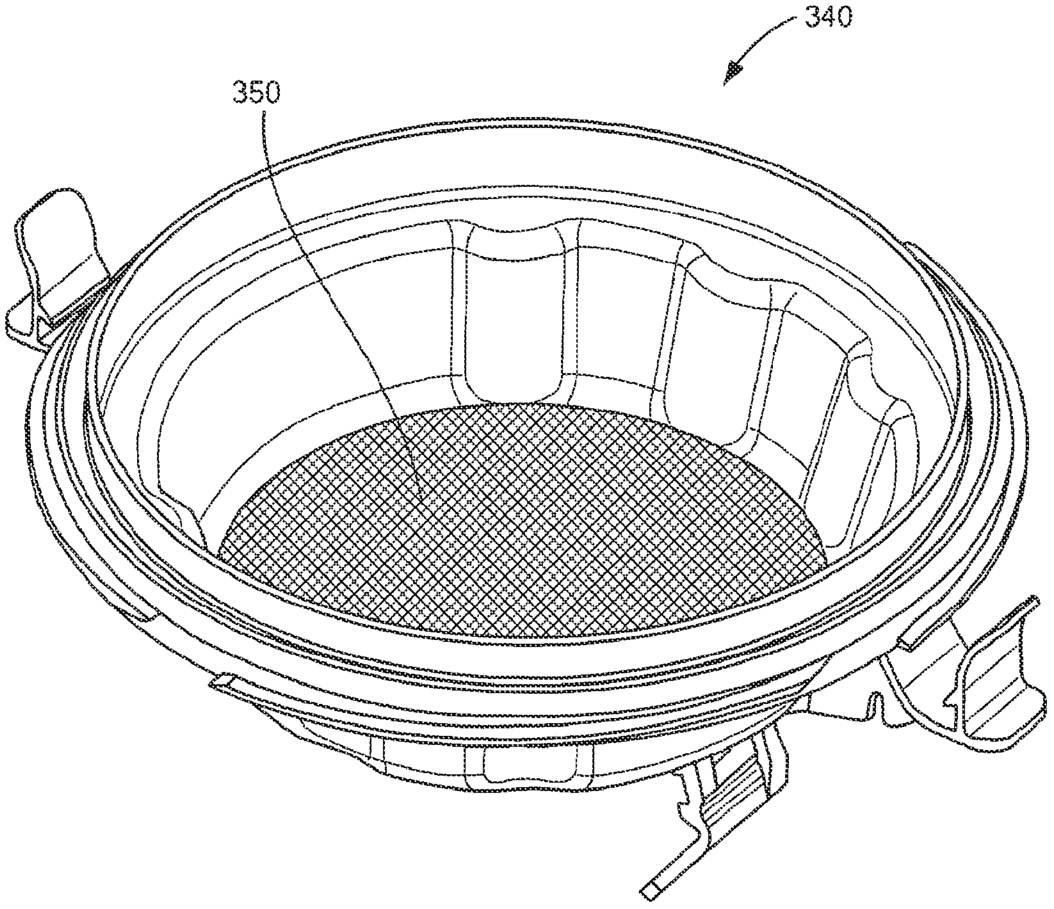
FIG. 12 illustrates a lid with an integral filter in accordance with an embodiment.

In various embodiments, a filter may be provided for any of the liquid container systems described above. This filter, which may be removable, filters the liquid withdrawn from the container. In a particular embodiment, a filter 350 may be built into the underside of the lid 340 in the container assembly, as illustrated in FIG. 12. Liquid withdrawn from the container through the lid outlet can thereby be filtered. The lid 340 and filter 350 advantageously prevent erroneous assembly of the system and eliminate cross-contamination during paint disposal.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A liquid container system for use with a gravity fed spray gun, comprising:

a liner comprising a closed end and an open end, wherein the liner is adapted to hold a liquid, and wherein the liner is adapted to collapse as the liquid is removed from the liquid container system of the gravity fed spray gun;

a lid comprising an inlet, an outlet, a sidewall that terminates at the inlet, a filter that is generally planar and positioned in an interior portion of the lid and positioned completely between the inlet and outlet, and wherein the filter has a diameter, wherein the outlet has a diameter, wherein the inlet has a diameter, wherein the diameter of the filter is smaller than the diameter of the inlet, and wherein the diameter of the filter is larger than the diameter of the outlet; and a ring configured to engage at least a portion of the lid in an unassembled state, wherein the lid, ring, and liner are fixedly attached in the unassembled state.

2. The liquid container system of claim 1, wherein the lid and the ring are configured to rotate relative to each other.

3. The liquid container system of claim 1, wherein the lid comprises at least one projection extending axially outward from an outer surface of the lid.

4. The liquid container system of claim 1, wherein the ring is removably attached to the lid.

5. The liquid container system of claim 1, wherein the ring comprises one or more protrusions that project radially outward.

6. The liquid container system of claim 5, wherein the one or more protrusions of the ring that project radially outward are circumferentially spaced along an outside surface of the ring.

7. The liquid container system of claim 5, wherein the one or more protrusions of the ring that project radially outward intersect a terminal edge of the ring.

8. The liquid container system of claim 5, wherein the one or more protrusions that project radially outward are discrete and separated from each other.

9. The liquid container system of claim 5, wherein the one or more protrusions of the ring that project radially outward are discrete and spaced apart from each other around at least a portion of the circumference of the ring.

10. The liquid container system of claim 9, wherein the one or more protrusions of the ring further extend axially for at least a portion of a thickness of the ring.

11. The liquid container system of claim 1, wherein the ring is configured to rotate about an axis of the lid.

12. The liquid container system of claim 1, further comprising a paint cup adapted to engage the ring.

13. The liquid container system of claim 12, wherein an assembly in the assembled state includes the lid, liner, ring, and paint cup.

14. The liquid container system of claim 12, wherein the ring is configured to engage at least a portion of the paint cup in the assembled state.

15. The liquid container system of claim 14, wherein the ring comprises at least one rib segment configured for closing the assembly into the assembled state.

16. The liquid container system of claim 1, wherein the ring further comprises internal protrusions.

17. The liquid container system of claim 16, wherein in an assembled state, a portion of the liner is between the ring and the lid.

18. The liquid container system of claim 1, wherein the filter is bonded to the lid and wherein the lid has no obstruction to the flow of liquid between the inlet and the filter.

19. The liquid container system of claim 1, wherein the filter is bonded to the lid.

20. The liquid container system of claim 19, wherein the filter is bonded to the lid at an internal radial protrusion of the lid.

21. The liquid container system of claim 19, wherein the filter is substantially bonded to the lid only on a single planar side.

22. The liquid container system of claim 21, wherein at least one portion of the interior wall of the lid between the filter and the outlet has a curved contour as viewed in cross-section.

* * * * *